(12) United States Patent
Rolland et al.

(10) Patent No.: US 12,442,762 B2
(45) Date of Patent: Oct. 14, 2025

(54) OPTICAL MILLIMETER-WAVE OSCILLATOR DISCIPLINED BY ROTATIONAL SPECTROSCOPY

(71) Applicant: IMRA America, Inc., Ann Arbor, MI (US)

(72) Inventors: Antoine Jean Gilbert Rolland, Longmont, CO (US); James Greenberg, Boulder, CO (US); Brendan Heffernan, Boulder, CO (US); Rubab Amin, Longmont, CO (US)

(73) Assignee: IMRA America, Inc., Ann Arbor, MI (US)

( * ) Notice: Subject to any disclaimer, the term of this patent is extended or adjusted under 35 U.S.C. 154(b) by 299 days.

(21) Appl. No.: 18/193,954

(22) Filed: Mar. 31, 2023

(65) Prior Publication Data

US 2023/0333012 A1 Oct. 19, 2023

Related U.S. Application Data

(60) Provisional application No. 63/363,006, filed on Apr. 14, 2022.

(51) Int. Cl.
*G01N 21/35* (2014.01)
*G01N 21/3504* (2014.01)
*G01N 21/3581* (2014.01)

(52) U.S. Cl.
CPC ..... *G01N 21/3581* (2013.01); *G01N 21/3504* (2013.01); *G01N 2201/0612* (2013.01)

(58) Field of Classification Search
CPC ........... G01N 21/3581; G01N 21/3504; G01N 2201/0612
See application file for complete search history.

(56) References Cited

U.S. PATENT DOCUMENTS

| | | | | |
|---|---|---|---|---|
| 2004/0017833 | A1* | 1/2004 | Cundiff | H01S 3/1112 372/18 |
| 2013/0301664 | A1* | 11/2013 | Prather | G02F 2/002 372/28 |
| 2015/0236789 | A1* | 8/2015 | Vahala | H03L 7/16 398/192 |
| 2016/0254646 | A1* | 9/2016 | Li | H03L 7/00 372/32 |
| 2018/0095003 | A1* | 4/2018 | Vahala | G02B 6/12 |
| 2018/0329274 | A1* | 11/2018 | Perrella | H01S 3/1306 |
| 2019/0033235 | A1* | 1/2019 | Neill | G01J 3/453 |
| 2019/0204786 | A1* | 7/2019 | Herbsommer | G04F 5/14 |

(Continued)

OTHER PUBLICATIONS

Newman et al., Photonic integration of an optical atomic clock, arXiv:1811.00616v1 [physics.optics], https://doi.org/10.48550/arXiv.1811.00616, Publication Date: Nov. 1, 2018 (Year: 2018).*

(Continued)

*Primary Examiner* — Hugh Maupin
(74) *Attorney, Agent, or Firm* — Knobbe Martens Olson & Bear LLP

(57) ABSTRACT

A photonic millimeter-wave oscillator is based on a heterodyne beatnote of two continuous wave lasers and is configured to provide a narrow linewidth output when the frequency difference is disciplined with rotational spectroscopy of molecules using frequency modulation spectroscopy.

21 Claims, 17 Drawing Sheets

(56) References Cited

U.S. PATENT DOCUMENTS

| | | | |
|---|---|---|---|
| 2019/0235445 A1 | 8/2019 | Han et al. | |
| 2020/0166404 A1* | 5/2020 | Fruehling | G01J 3/0205 |
| 2021/0119635 A1 | 4/2021 | Han et al. | |
| 2022/0190920 A1* | 6/2022 | El Amili | H04B 10/25758 |
| 2022/0416498 A1* | 12/2022 | Redding | G02F 1/353 |

OTHER PUBLICATIONS

V. Ahrens et al., "Sub-Doppler Saturation Spectroscopy of HCN up to 1 THz and Detection of J=3→2 (4→3) Emission from TMC1," Z. Naturforsch. vol. 57a, pp. 669-681, https://doi.org/10.1515/zna-2002-0806 (2002).

J.P. Gordon et al., "Molecular Microwave Oscillator and New Hyperfine Structure in the Microwave Spectrum of NH3," Phys. Rev. vol. 95, p. 282, https://doi.org/10.1103/PhysRev.95.282 (1954).

M.T. Hummon et al., "2D Magneto-Optical Trapping of Diatomic Molecules," Phys. Rev. Lett., vol. 110, No. 14, pp. 143001/1-143001/5, https://doi.org/10.1103/PhysRevLett.110.143001, (2013).

C.K. Jen, "Molecular and nuclear magnetic moments in microwave Zeeman spectra," Physica, vol. 17, No. 3-4 (1951).

M. Kim et al., "Chip-Scale Terahertz Carbonyl Sulfide (OCS) Clock: An Overview and Recent Studies on Long-Term Frequency Stability of OCS Transitions," IEEE Trans. Terahertz Sci. and Tech., vol. 9, No. 4, 14 pages (2019).

E.B. Norrgard et al., "Submillikelvin Dipolar Molecules in a Radio-Frequency Magneto-Optical Trap," Phys. Rev. Lett. vol. 116, 063004, https://doi.org/10.1103/PhysRevLett.116.063004 (2016).

K. Ohta et al., "Ab initio calculation of hyperfine splitting constants of molecules," J. Chem. Phys. vol. 73, p. 1770, https://doi.org/10.1063/1.440313 (1980).

S. Ospelkaus et al., "Controlling the Hyperfine State of Rovibronic Ground-State Polar Molecules," Phys. Rev. Lett. vol. 104, 030402, https://doi.org/10.1103/PhysRevLett.104.030402, (2010).

A.C. Vutha et al., "Orientation-dependent hyperfine structure of polar molecules in a rare-gas matrix: a scheme for measuring the electron electric dipole moment," arXiv:1806.06774v1 (2018).

C. Wang et al., "An on-chip fully electronic molecular clock based on sub-terahertz rotational spectroscopy," Nat. Electron. vol. 1, pp. 384-385, https://doi.org/10.1038/s41928-018-0102-4 (2018).

C. Wang et al., "Chip-Scale Molecular Clock," IEEE J. Sol. State Circuits, vol. 54, No. 4, pp. 914-926 (2019).

C. Wang et al., "A Terahertz Molecular Clock on CMOS Using High-Harmonic-Order Interrogation of Rotational Transition for Medium-/Long-Term Stability Enhancement," IEEE J. Sol. State Circuits, vol. 56, No. 2, pp. 566-580 (2021).

D.J. Wineland et al., "Results with the Special-Purpose Ammonia Frequency Standard," 31st Ann. Symp. on Frequency Control, pp. 562-573 (1977).

\* cited by examiner

OPTICAL MILLIMETER-WAVE OSCILLATOR DISCIPLINED BY ROTATIONAL SPECTROSCOPY

CLAIM OF PRIORITY

This application claims the benefit of priority to U.S. Provisional Appl. No. 63/363,006 filed Apr. 14, 2022 and incorporated in its entirety by reference herein.

BACKGROUND

Field

The present application relates generally to optical millimeter-wave oscillators.

Description of the Related Art

Electromagnetic waves in the millimeter-wave and Terahertz domain (100 GHz to 3 THz) which can simultaneously exhibit high spectral purity and a stability ruled by molecules or atoms are of great interest for many applications comprising wireless communications, autonomous cars, imaging of cosmic radiation. Additionally, the path towards chip-scalability is bright with the emergence of photonic technologies on-chip, in particular exploiting the silicon nitride platform.

Accurate and precise clocks with low size and weight and power are a crucial component of position, navigation and timing systems such as the Global Navigation Satellite System of which GPS is a major component. The dominant component of the position uncertainty of an object is its timing uncertainty multiplied by the speed of light, a very long lever arm. As the GPS mission is reaching its end of mission life, efforts are underway to find new technologies so that the next generation performs better. With the adoption of the 5G network, the increasing bit capacities are putting greater demands on the synchronization of network components. In order to prevent missed call handovers, capacity reductions, and network downtimes, synchronization tolerances on the order of 50 ns have been proposed.

There exist molecules that possess a strong rotational absorption spectrum. The Han group at MIT shows that probing the carbonyl sulfide (OCS) molecule with millimeter-wave (mmW) radiation could be used to generate a clock that is competitive with commercial miniature atomic clocks. The magnetic moment of rotation for some of these molecules is small, leading to excellent insensitivity to magnetic fields compared to atomic clocks. Many of these molecules exist in the gas phase at room temperature, leading to considerable simplification of the absorption sample preparation.

SUMMARY

In certain implementations, a photonic millimeter-wave oscillator is based on a heterodyne beatnote of two continuous wave lasers, and is configured to provide a narrow linewidth output when the frequency difference is disciplined with rotational spectroscopy of molecules using frequency modulation spectroscopy.

In certain implementations, a photonic millimeter-wave oscillator is based on the photodetection of an optical pulse train generated by an optical frequency comb, and is configured to provide a narrow linewidth output when a repetition rate frequency of the optical pulse train is disciplined with rotational spectroscopy of molecules using frequency modulation spectroscopy.

In certain implementations, a method of stability transfer of an optical pulse train repetition rate noise properties to two diode lasers through optical injection is provided. The method comprises providing a narrow linewidth output when the frequency difference between the two diode lasers is disciplined with rotational spectroscopy of molecules using frequency modulation spectroscopy.

In certain implementations, an electro-optic frequency comb has a repetition rate disciplined by rotational spectroscopy of molecules through a feedback control of a microwave oscillator driving electro-optic modulators.

In certain implementations, a method of generating an optical pulse train pre-stabilized with two Stokes waves is provided. The method comprises generating the two Stokes waves using stimulated Brillouin scattering in a fiber cavity into which two diode lasers are optically injected with a frequency difference disciplined by rotational spectroscopy of molecules.

In certain implementations, a method comprises generating a clock signal and stable baseband or microwave oscillator through electro-optic division of two optical lines, with frequency difference disciplined by rotational spectroscopy of molecules, through phase-locking of the microwave oscillator driving the electro-optic modulators that generates an error signal.

In certain implementations, a method comprises generating a clock signal and stable baseband or microwave oscillator through optical frequency division of an optically carried millimeter-wave signal with the synchronization of an optical pulse train with a repetition rate frequency in the microwave and RF domain.

In certain implementations, a method comprises cancellation of residual amplitude modulation in an optical phase modulator comprising an heterodyne beatnote of two optical lines disciplined by rotational spectroscopy of molecules.

In certain implementations, a molecular clock comprises a source of low phase noise millimeter-wave radiation. The molecular clock further comprises a vacuum sealed chamber or waveguide configured to transmit the millimeter-wave radiation. The chamber or waveguide is filled with a pure sample of a molecule. In certain implementations, the molecular clock further comprises a photosensitive element sensitive to the millimeter-wave power at the output of the chamber or waveguide. The molecular clock further comprises frequency modulators configured to modulate a frequency of the millimeter-wave radiation. The molecular clock further comprises circuitry configured to generate an error signal proportional to a frequency difference between the millimeter-wave radiation and the peak absorption of the sample due to a rotational transition. The molecular clock further comprises a feedback system configured to adjust the frequency of the mean millimeter-wave radiation to coincide with a peak absorption of the sample due to a rotational transition. The molecular clock further comprises a frequency division mechanism configured to convert the millimeter-wave radiation into a signal in an RF or microwave domain.

DETAILED DESCRIPTION

Overview

Figure 1A:
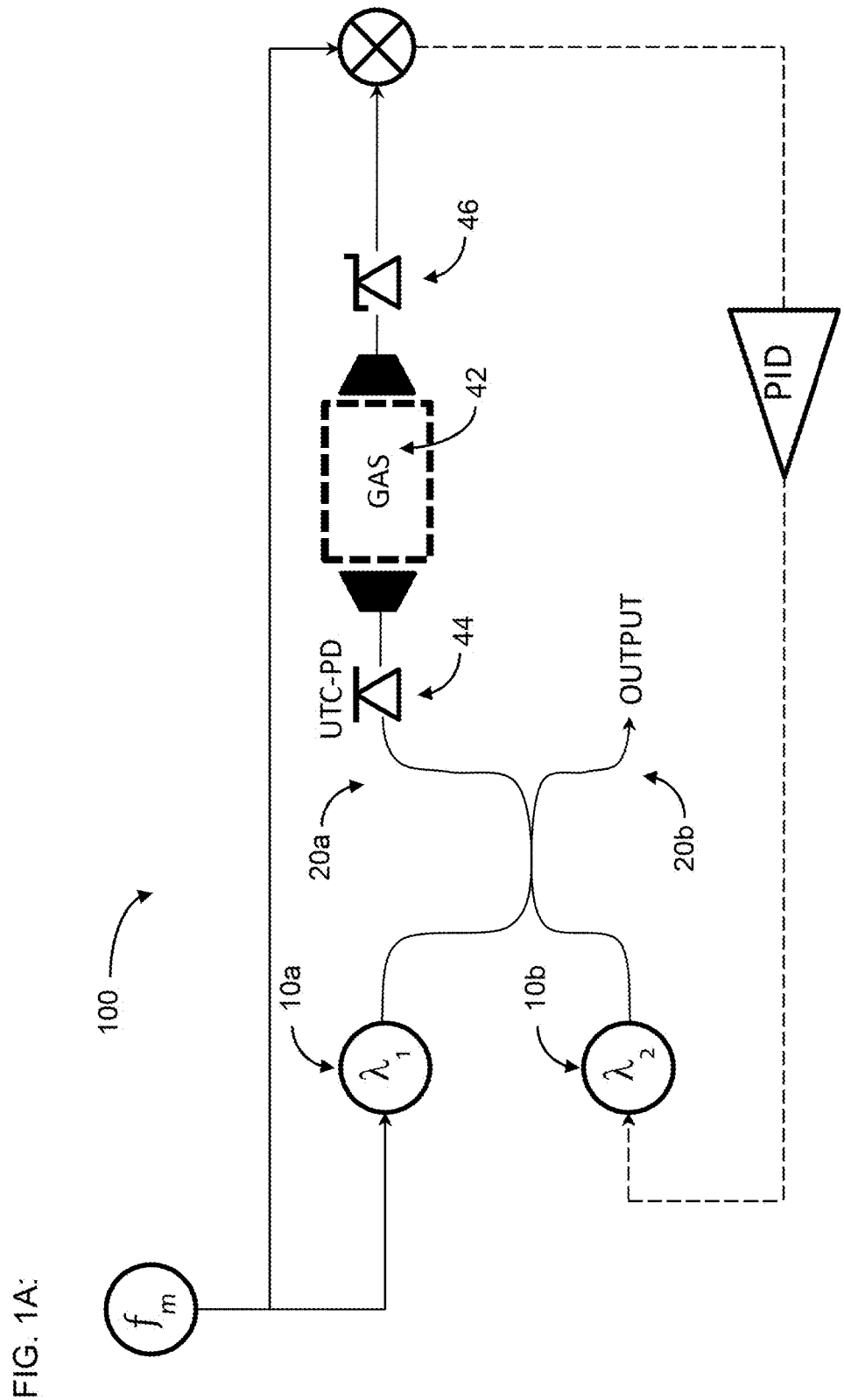
FIG. 1A schematically illustrates an example of a two optical line millimeter-wave oscillator disciplined with rotational spectroscopy in which the frequency modulation is realized directly on the current of one laser in accordance with certain implementations described herein.

While the first non-astronomical definition of the second was based on the microwave inversion splitting of the ammonia molecule (1949), molecular clocks other than ammonia have not been studied until 2018 when the Han group at MIT frequency locked millimeter-wave (mmW) radiation to a rotational transition of carbonyl sulfide (OCS). In the MIT work, a selection criterion which led to the choice of OCS was the simple energy level structure, e.g., there is only one absorption line per rotational level. However, this selection criterion reduces the choice of molecule and excludes any species that contains atoms with nuclear spin. In certain implementations described herein, the millimeter-wave oscillator is disciplined by rotational spectroscopy of other molecular gases, including but not limited to hydrogen cyanide (HCN) and nitrous oxide ($N_2O$). HCN has potentially better frequency instability and better magnetic insensitivity compared to OCS. In contrast to OCS and HCN, $N_2O$) is non-toxic, but has an expected clock instability that is only marginally worse than for OCS.

In certain implementations, a photonic-based millimeter-wave oscillator is configured using two optical continuous waves whose frequency difference is disciplined to a molecular absorption signal using frequency modulation spectroscopy. One optical wave is directly modulated (for example the current) or externally modulated with a phase modulator. Frequency difference generation is realized with a photosensitive element emitting in an antenna converting optical photons to a continuous wave millimeter-wave radiation. The millimeter-wave radiation travels through molecular gas. Signal absorption is detected with an amplitude detector coupled to an antenna. Lock-in detection demodulates the absorption signal and provides a dispersion signal that is used to feedback and correct the frequency difference with a proportional-integral-derivative (PID) filter. Feedback is either realized directly to the laser current or through an optical frequency shifter's voltage-controlled oscillator.

In certain implementations, a photonic-based millimeter-wave oscillator is configured using an optical pulse train from an optical frequency comb with a repetition rate frequency that is disciplined to a molecular absorption signal using frequency modulation spectroscopy. All the comb lines are modulated. Repetition rate generation is realized with a photosensitive element emitting in an antenna converting optical photons to a continuous wave millimeter-wave radiation. The millimeter-wave radiation travels through molecular gas. Signal absorption is detected with an amplitude detector coupled to an antenna. Lock-in detection demodulates the absorption signal and provides a dispersion signal that is used to feedback and correct the repetition rate with a proportional-integral-derivative (PID) filter. Feedback is either realized directly to the laser current or through an optical frequency shifter's voltage-controlled oscillator.

In certain implementations, a photonic-based millimeter-wave oscillator is configured using an optical pulse train in combination with two diode lasers that are optically injected with the optical pulse train. This converts an optical pulse train into a continuous amplitude envelope exhibiting the same noise properties as the repetition rate.

Figure 8:
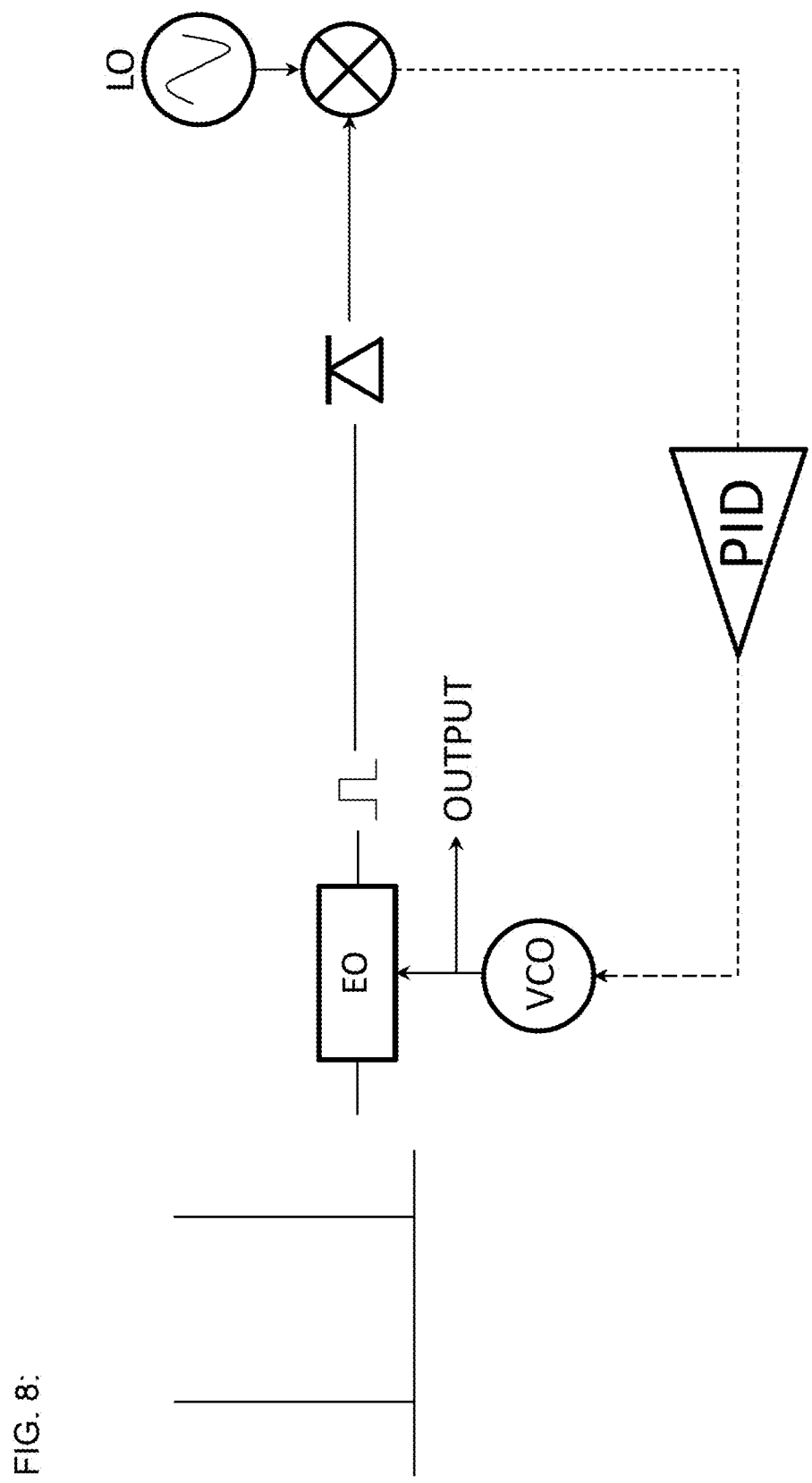

In certain implementations, a photonic-based millimeter-wave down-counter is configured using one electro-optic comb generator with a dual-optical-pump whose frequency difference is disciplined by rotational spectroscopy (see, e.g., FIG. 8). Heterodyne beatnote of interleaved electro-optic combs generates a RF (Radio Frequency) being a noise and stability replica of the original beatnote in the millimeter-wave domain. Moreover, by phase-locking the microwave reference driving the electro-optic comb to the RF signal gives a frequency division of the millimeter-wave signal to the microwave domain.

Figure 9:
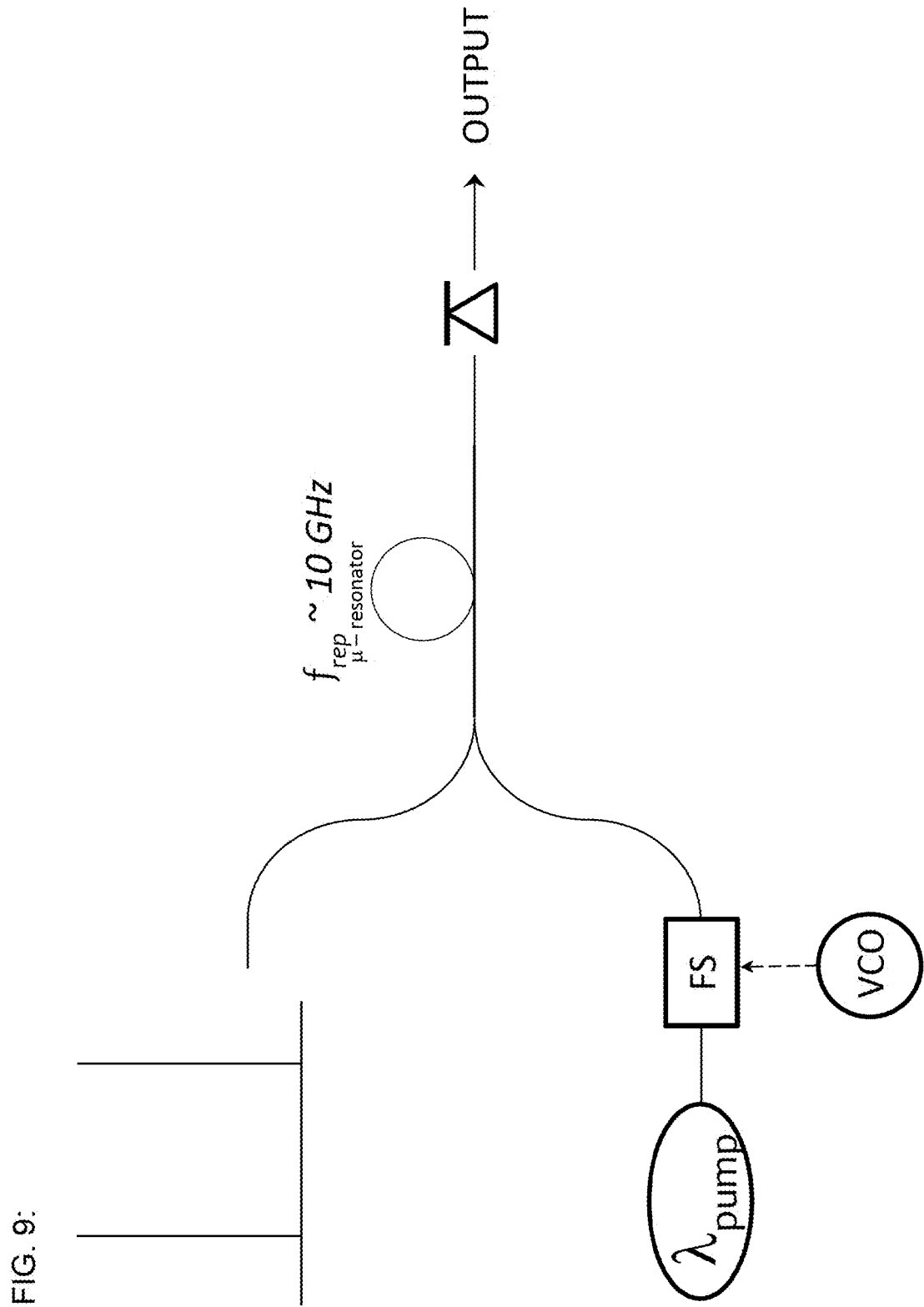
FIG. 9 schematically illustrates the down-conversion of two optical lines through an optical pulse train at a repetition rate frequency that is in the microwave domain in accordance with certain implementations described herein.

In certain implementations, a photonic-based millimeter-wave down-counter is configured using an optical pulse train with a repetition rate in the microwave range (see, e.g., FIG. 9). Optical injection of two optical lines with millimeter-wave frequency difference to the optical pulse train results in the synchronization of the envelope of the two optical lines and the microwave repetition rate. The microwave repetition rate is generated using a photosensitive element.

Figure 10:
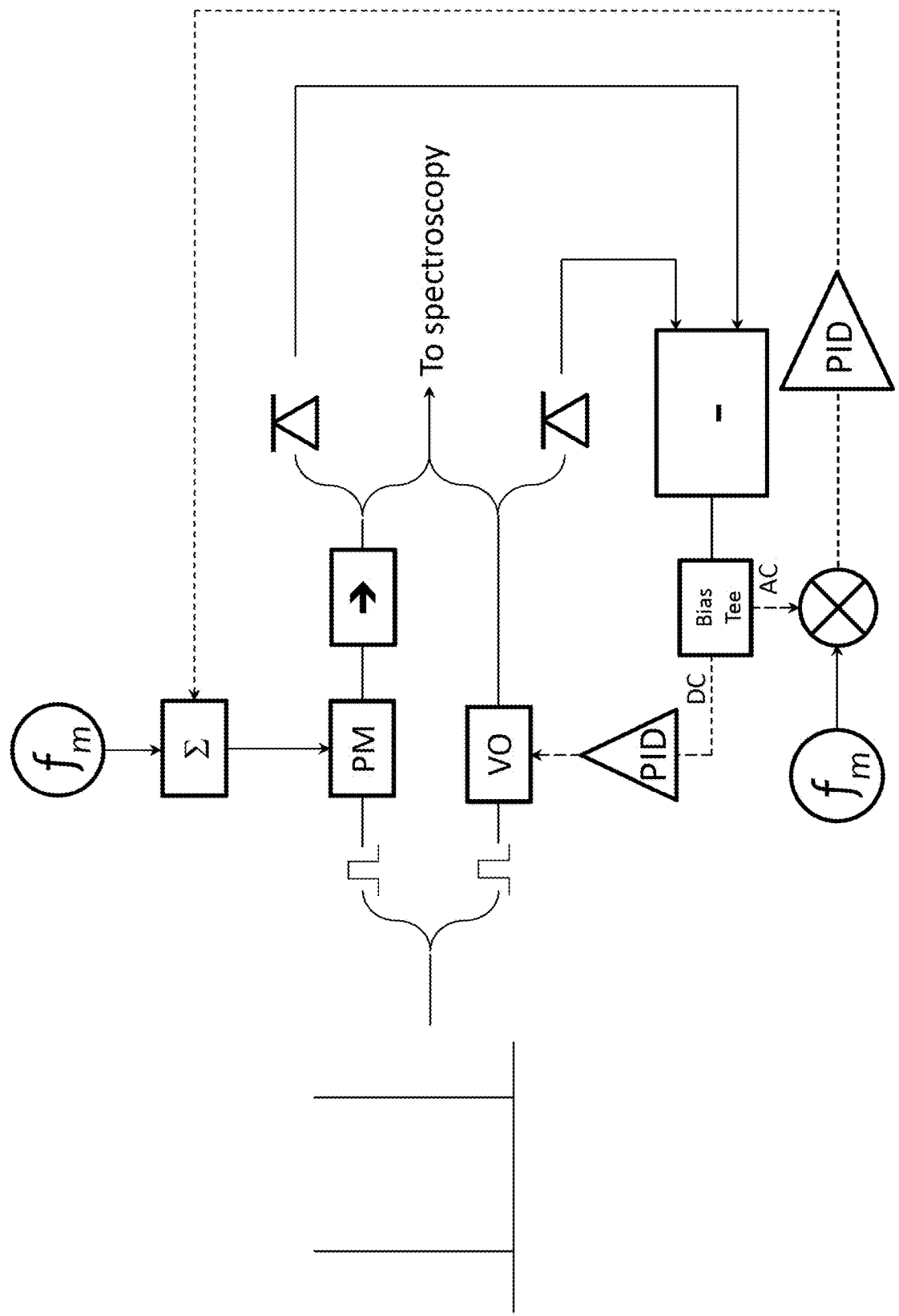
FIG. 10 schematically illustrates the cancellation of residual amplitude modulation of a phase modulated optical line in accordance with certain implementations described herein.

In certain implementations, cancellation of the residual amplitude modulation, in the case of external modulation in an electro-optic modulator, is realized through demodulation in the optical domain of this modulation tone and then is sent back to the DC port of a bias T driving the electro-optic modulator (see, e.g., FIG. 10). Certain such implementations provide a mitigation of the residual amplitude modulation and therefore cancel a baseline drift in closed-loop operation that would lead to environmental dependent frequency drifts.

Example Implementations

Figure 1B:
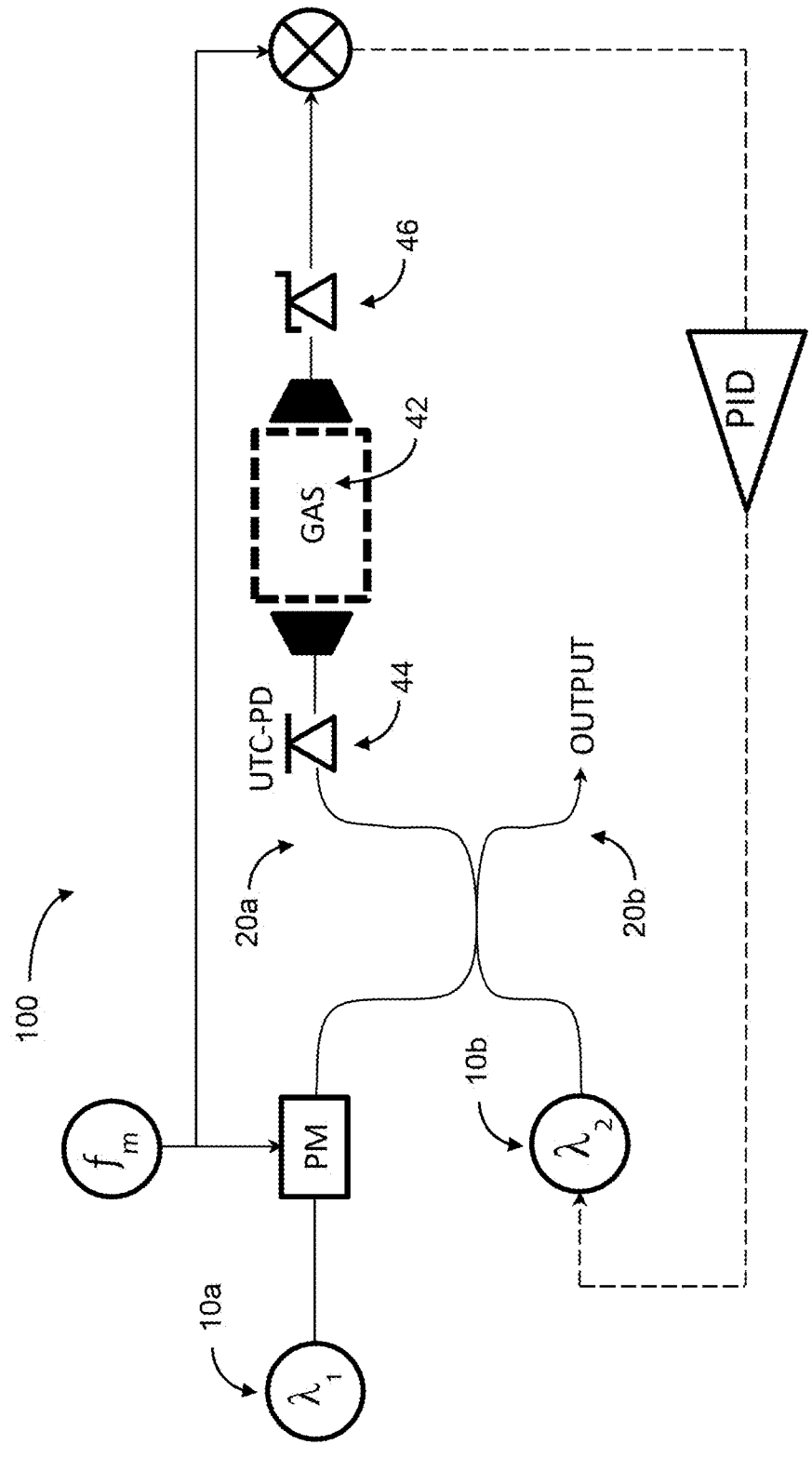
FIG. 1B schematically illustrates an example of a two optical line millimeter-wave oscillator disciplined with rotational spectroscopy in which the frequency modulation is realized externally through an optical phase modulator in accordance with certain implementations described herein.
Figure 1C:
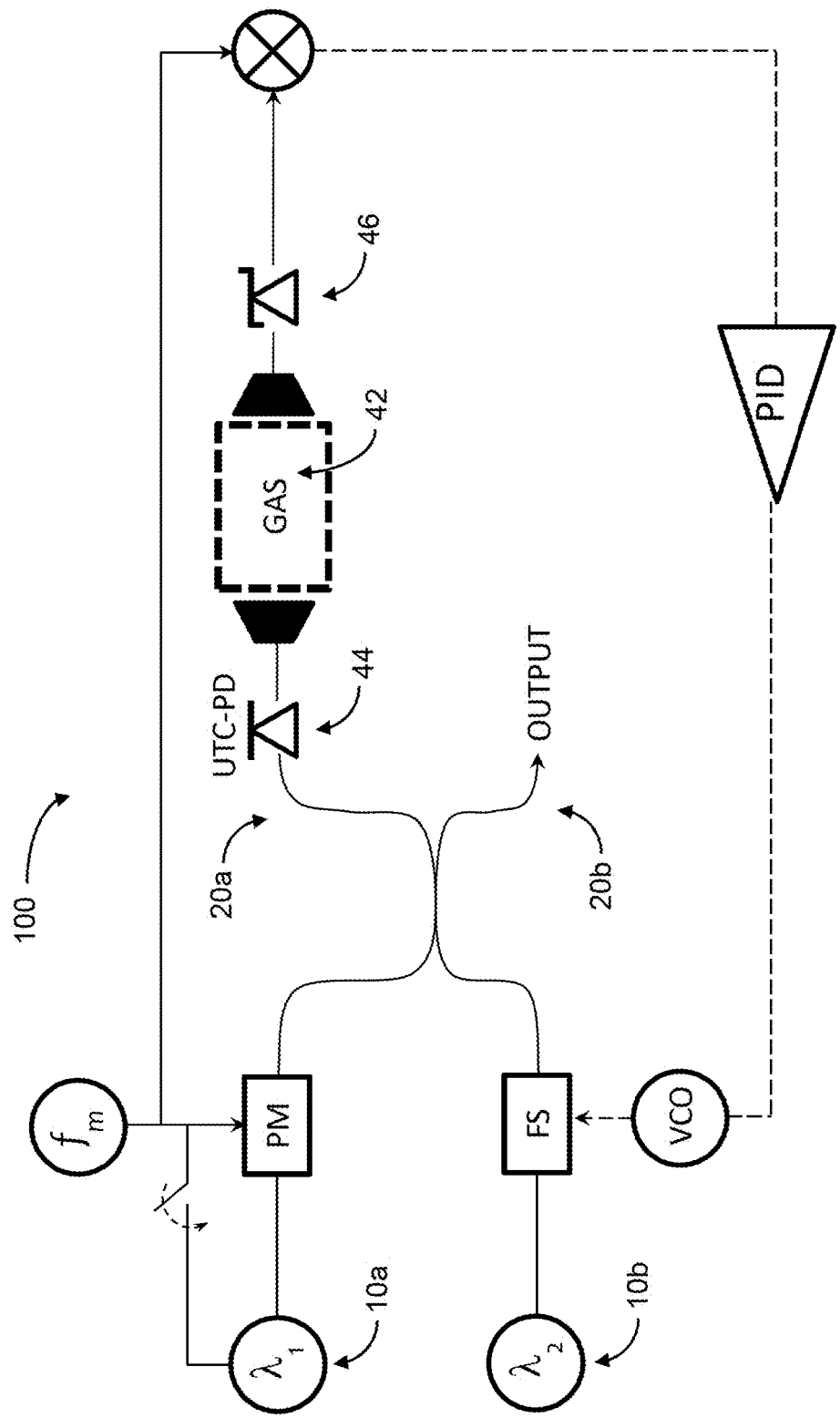
FIG. 1C schematically illustrates an example of a two optical line millimeter-wave oscillator disciplined with rotational spectroscopy in which the feedback control is alternatively applied externally to an optical frequency shifter in accordance with certain implementations described herein.
Figure 11:
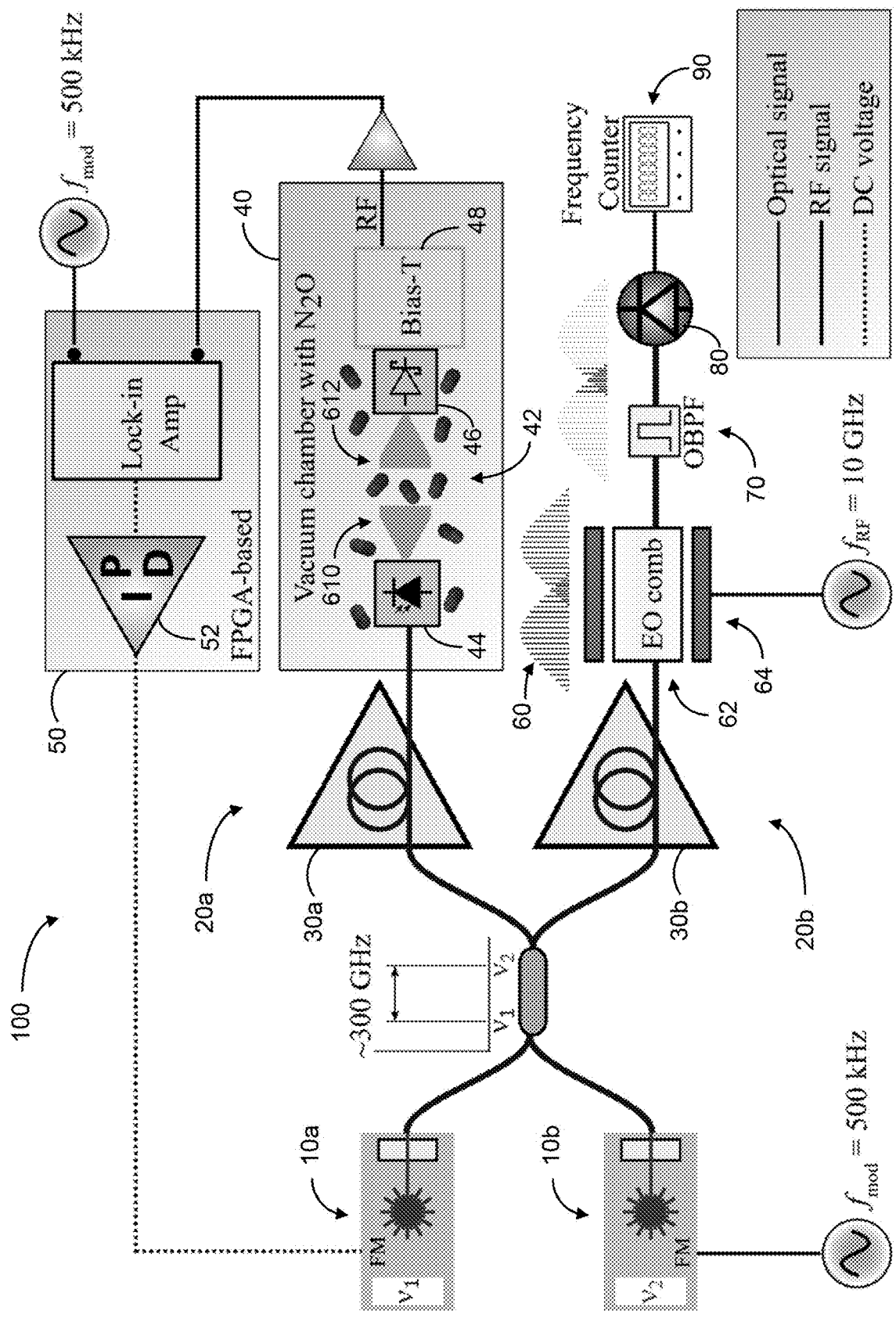
FIG. 11 schematically illustrates an example molecular clock based on the rotational spectroscopy of nitrous oxide using two continuous wave lasers and the electro-optical down conversion to detect the clock signal in accordance with certain implementations described herein.

As schematically illustrated by FIG. 11, in certain implementations of an optical millimeter-wave oscillator 100, the light from two diode lasers 10a, 10b having wavelengths $\lambda_1$ and $\lambda_2$, respectively, are tuned $v_2-v_1=\Delta f \sim 300$ GHz apart and are combined with a 50/50 combiner/splitter and sent on two optical paths 20a,b. One of the diode lasers 10a, 10b is frequency modulated (e.g., at 500 kHz). The light on the upper optical pathway 20a in FIG. 11 is amplified using an Erbium-doped fiber amplifier (EDFA) 30a and then sent into a vacuum chamber 40 containing gas 42 (e.g., $N_2O$ gas) via a hermetically sealed feedthrough. The light is photo-detected by a uni-travelling carrier photodiode (UTC-PD) 44 which subsequently radiates mm-wave radiation at an optical heterodyne frequency equal to the frequency difference of the two diode lasers $\Delta f$. Additionally, one of the diodes lasers 10a, 10b is current-modulated (e.g., as schematically illustrated by FIG. 1A showing a two laser local oscillator with direct modulation and direct feedback) or phase modulated (e.g., as schematically illustrated by FIG. 1B showing a two laser local oscillator with external modulation and direct feedback) at $f_m$ to generate sidebands of the same frequency in the mm-wave radiation. FIG. 1C shows a two laser local oscillator with external feedback. The mm-wave radiation is detected by a detector 46 (e.g., Schottky diode) which produces an electrical signal that is split into RF and DC components via a bias tee 48. The DC signal tracks the molecular absorption strength. The amplified RF signal is processed by an FPGA-based instrument 50 which performs lock-in amplification filtering, and PID loop feedback with a PID filter 52 to the diode laser's frequency. The light on the lower optical arm 20b generates two electro-optic (EO) combs 60 with comb mode spacing of 10 GHz driven by a synthesizer 64 locked to a stable Rb reference. The overlapping comb modes are isolated by an optical band-bass filter (OBPF) 70 and photodetected by photodetector 80. The resulting heterodyne frequency is measured by a frequency counter 90, also references to Rb. The counter tracks the absolute frequency of the mm-wave radiation disciplined by $N_2O$ absorption.

The mm-wave power is monitored via the current controller powering the UTC-PD 42. The UTC-PD 42 is biased between 0 V and −2 V exposed to approximately 20 mW of optical power. This pulls 9 mA of photocurrent from the current controller, which corresponded to approximately 0.2 mW of radiated mm-wave power.

Passing through the gas sample, the millimeter-wave power is detected with a millimeter-wave power detector 44 (e.g., single barrier diode or Schottky diode). When the millimeter-wave oscillator is frequency scanned, it is possible to observe an absorption line when the two lasers frequency difference is tuned very close to the expected frequency of a rotational transition of the gas being probed. This absorption line is merely a dip in a DC signal generated by the millimeter-wave amplitude detector.

When the detected signal at the millimeter-wave amplitude detector is being demodulated at the same frequency $f_m$ used for frequency modulation spectroscopy, a first order derivative signal (also called dispersion signal) of the absorption line can be generated.

The dispersion signal of an absorption line can be used as an error signal and correct very precisely the frequency of the millimeter-wave local oscillator using a proportional-integral-derivative (PID) filter 52 that locks the local oscillator at the zero-crossing of the dispersion signal. The PID controller drives the frequency of only one of the lasers 10a,b to correct the frequency difference. Therefore, the frequency difference of the two lasers 10a,b follows the frequency of the molecule rotational line.

The actuator being used for frequency correction of the millimeter-wave oscillator can be the current control of a diode laser. It is also possible to use an external frequency shifter when direct control of the laser is lacking. This can be realized through a single-side-band electro-optic modulator or an acousto-optic modulator. In this case, the PID controller is fed into a voltage controlled oscillator (VCO) that drives the optical modulator and therefore the frequency difference of two optical lines is being modulated.

Figure 2:
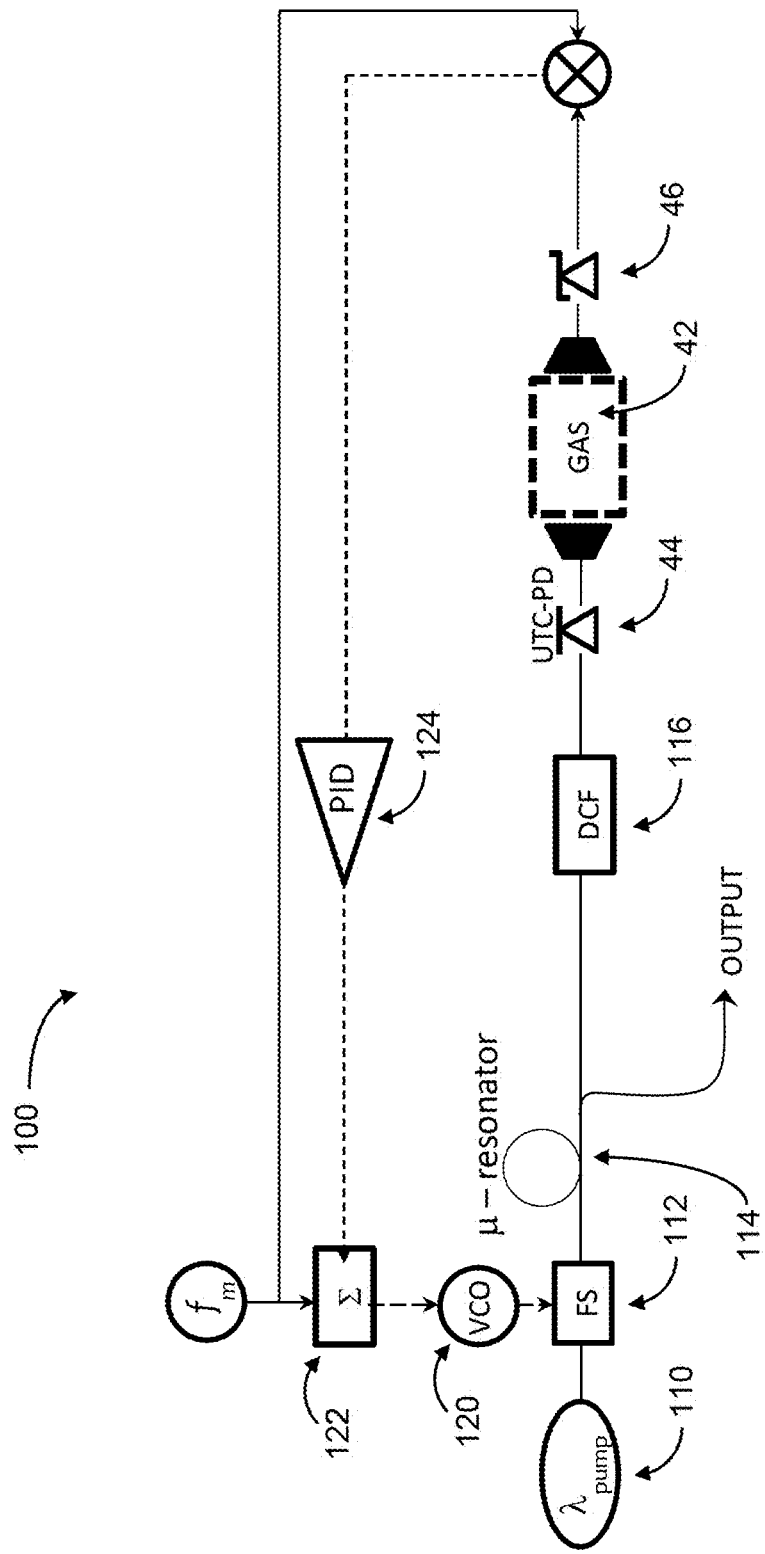
FIG. 2 schematically illustrates an example millimeter-wave oscillator utilizing direct comb spectroscopy to generate an optical pulse train using a soliton comb from an optical microresonator in accordance with certain implementations described herein.

FIG. 2 schematically illustrates an example implementation of an optical millimeter-wave oscillator 100 (e.g., direct comb spectroscopy) using an optical pulse train in accordance with certain implementations described herein. Microresonator based optical frequency combs are miniaturized optical frequency combs. They offer repetition rates in the orders of 100s of GHz, making them relevant for the photonic generation of millimeter-waves. When pumped with a continuous wave laser 110, having a frequency that is externally controlled through an external optical frequency shifter 112, a soliton comb can be generated through optical non-linearities in the resonator. At the output of the microresonator 114 is an optical pulse train with phase-locked optical comb modes with a repetition rate >100 GHz. Because the pulse train propagates in optical fiber (for filtering or amplification), dispersion control of this optical pulse train can be used in converting the pulse train into a millimeter-wave signal with a high signal-to-noise ratio. This can be realized with dispersion compensating fibers 116 or waveshapers.

As shown in FIG. 2, the frequency modulation is implemented through the modulation of the voltage-controlled oscillator 120 driving the optical frequency shifter on the pump laser optical path, which modulates all the comb lines. Additionally, in this example, after a stage of dispersion compensation fiber, the repetition rate frequency can be modulated also through the same voltage-controlled oscillator using a summing electronic circuit 122. To lock on the rotational line, the PID controller 124 is fed into this VCO 120. The repetition rate of the optical pulse train can be teed off to a photosensitive element and can lead to a millimeter-wave oscillator disciplined with rotational spectroscopy. Here, the feedback control is alternatively applied to the voltage-controlled oscillator driving an optical frequency shifter.

Figure 3:
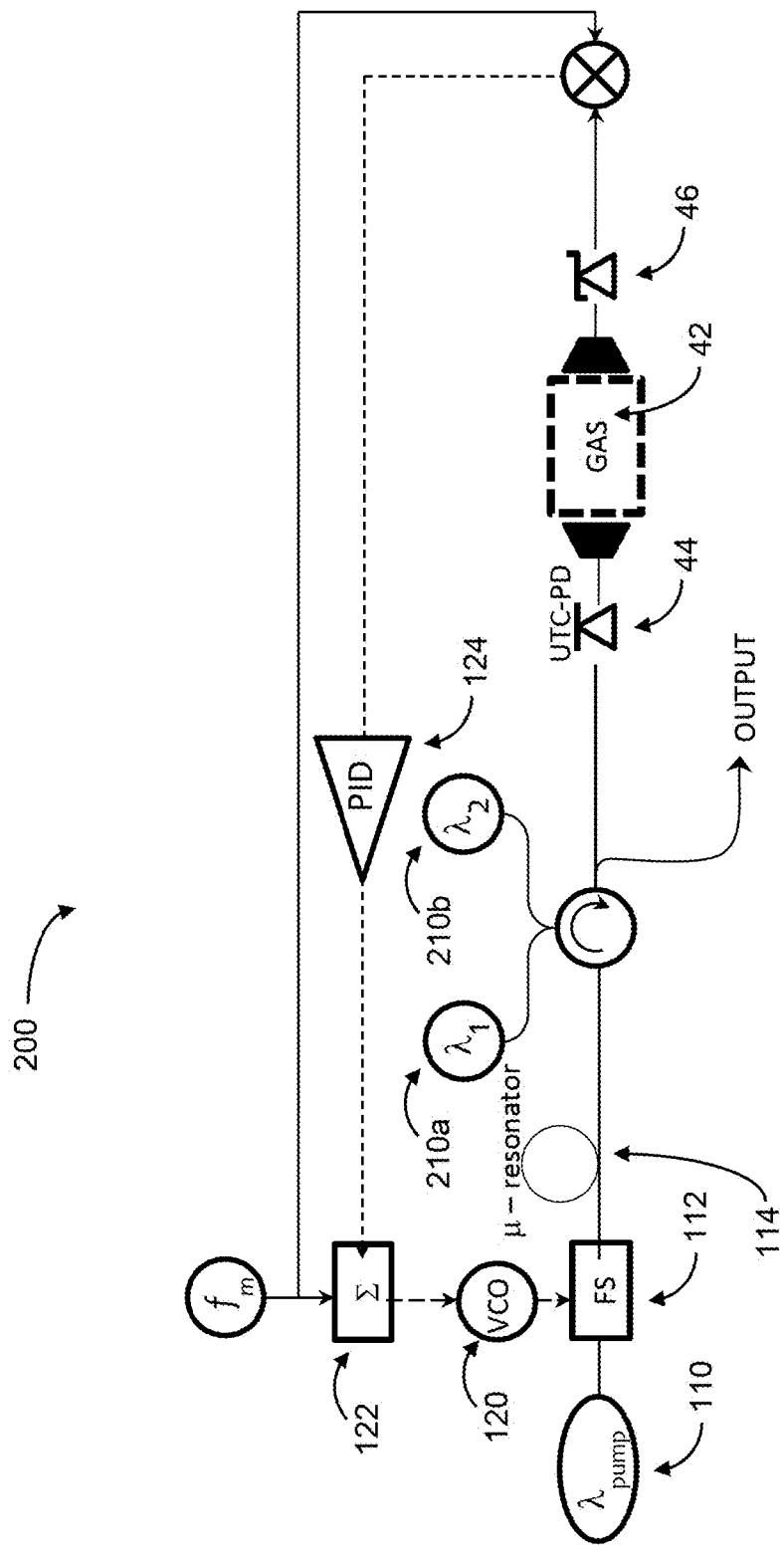
FIG. 3 schematically illustrates an example millimeter-wave oscillator configured to generate an optical pulse train using a soliton comb from an optical microresonator in accordance with certain implementations described herein.

When dispersion compensation is not effective nor trivial, one option is to transfer the noise properties of the repetition rate to a heterodyne beatnote of two laser diodes so dispersion in optical fiber is no longer a concern. FIG. 3 schematically illustrates a full experimental setup 200 for injection-locking LDs in accordance with certain implementations described herein. An external cavity diode laser 110 is frequency shifted using a carrier-suppressed single side band modulator (SSBM). It is amplified in an erbium-doped fiber amplifier (EDFA) and pumps a silicon nitride ring resonator 114 with a free spectral range (FSR) of approximately 301 GHz. By sweeping the pump laser frequency at a rate of 100 GHz/μs, a DKS comb in the single soliton regime is formed. The pump light is filtered from the resulting comb using a band stop filter (BSF). The comb is then amplified. Before photodetection the optical pulse train can be optically injected into two diode lasers 210a,b whose frequency difference is equal to that of the repetition rate. This can lead to a millimeter-wave oscillator disciplined with rotational spectroscopy. Here, the feedback control can be alternatively applied externally to an optical frequency shifter.

The full DKS comb can be sent to a 3-port circulator. Port 2 can be split and connected to two LD's with tunable wavelengths around 1550 nm and 1552 nm. Approximately 250 μW of power can be injected into each LD, corresponding to an estimated 1-3 μW of power in the comb tooth of interest. The frequency spacing of the comb teeth can be much greater than the locking range for these injected powers, which was measured to be on the scale of tens of MHz. Therefore, the entire comb can be injected into the LD cavity without any deleterious effects on the resulting lock stability. The laser light can be returned from port 2 to port 3.

Figure 4:
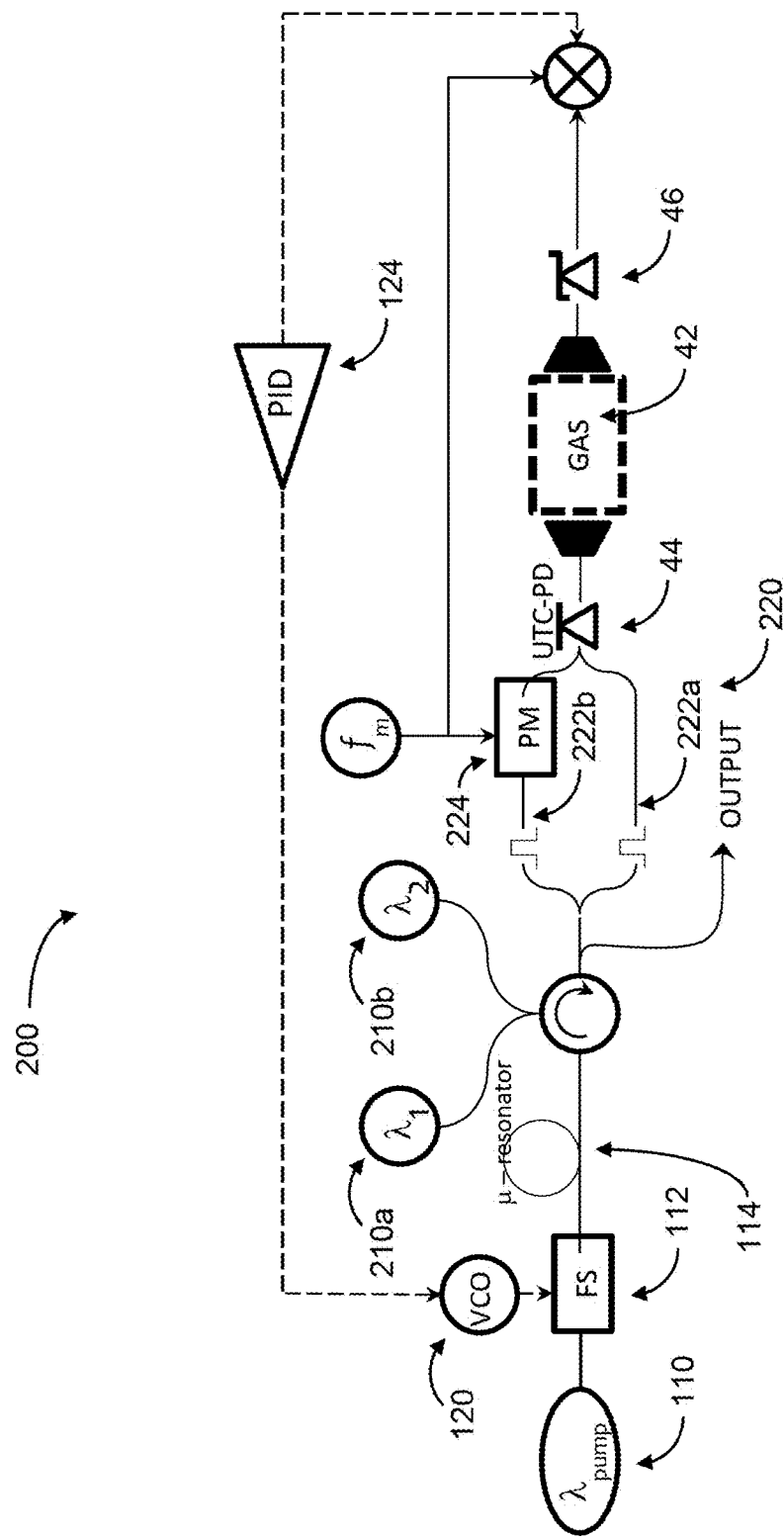
FIG. 4 schematically illustrates an example millimeter-wave oscillator configured to generate an optical pulse train using a soliton comb from an optical microresonator in accordance with certain implementations described herein.

FIG. 4 shows how to realize the generation of a pulse train and injected diode lasers while modulating the light externally (e.g., not through the voltage-controlled oscillator) in accordance with certain implementations described herein. The output of the two injected diode lasers 210a,b is split and propagates through an interferometer 220. This optical interferometer comprises two optical paths 222a,b in which are the two spectrally filtered optical lines. One optical line 222b can be modulated through an optical phase modulator 224. Before photodetection, the optical pulse train can be optically injected into two diode lasers 210a,b whose frequency difference is equal to that of the repetition rate. The frequency modulation can be done on a phase modulator placed on only one of the diode lasers 210a,b. This leads to a millimeter-wave oscillator disciplined with rotational spectroscopy. Here, the feedback control is alternatively applied externally to an optical frequency shifter.

Figure 5:
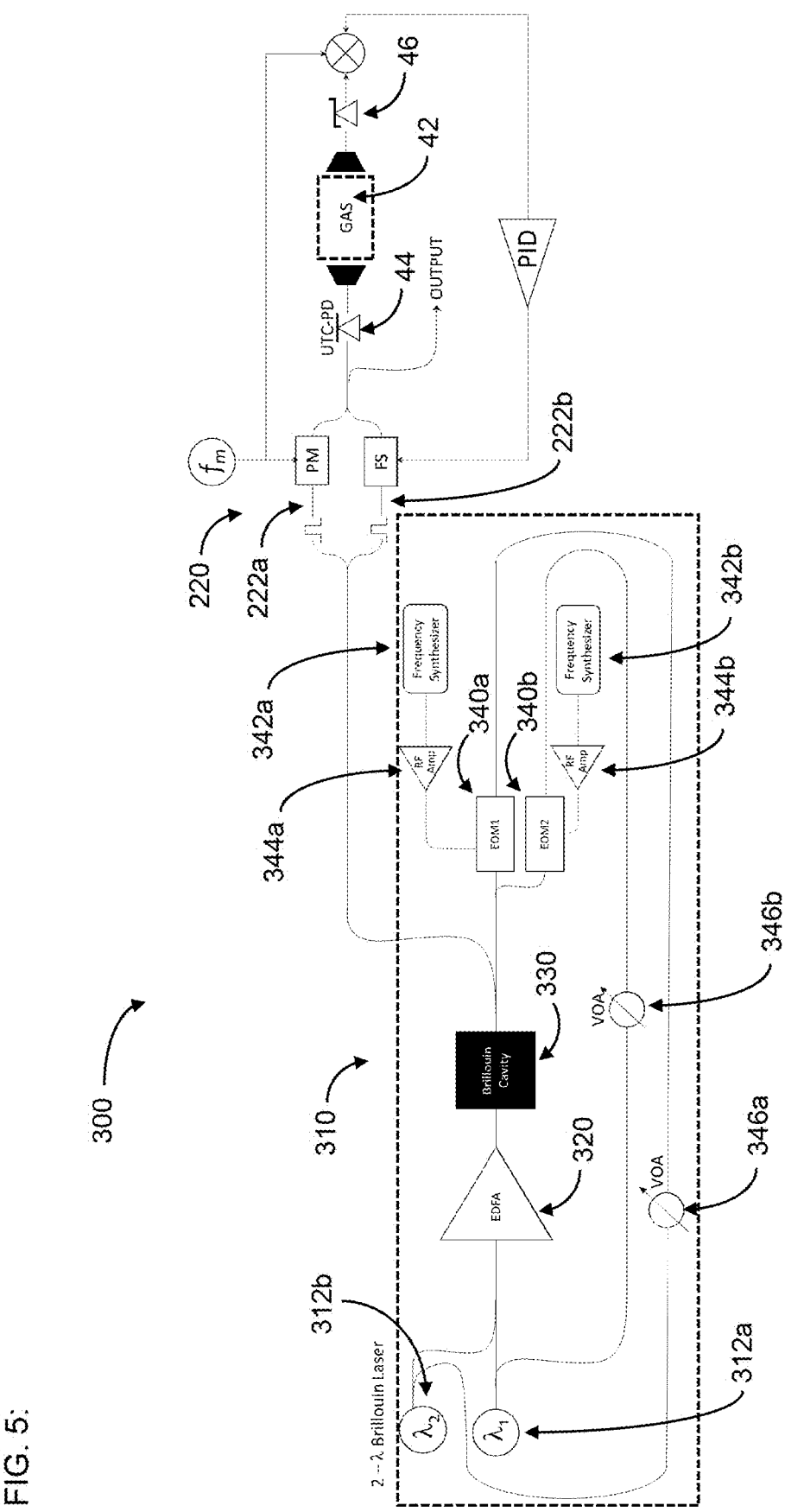
FIG. 5 schematically illustrates an example millimeter-wave oscillator configured to generate two optical lines through stimulated Brillouin scattering in a fiber-ring in accordance with certain implementations described herein.

FIG. 5 schematically illustrates another example of optically generated local oscillator 300 in accordance with certain implementations described herein. The following description of a dual-wavelength Brillouin laser 310 is duplicated for two lasers 312a,b that are frequency separated from about 100 GHz to a few THz. The diode laser 312a,b was a relatively large linewidth semiconductor diode laser (~1 MHz) incorporating no optical isolator, operating in the telecom C-band near infrared (NIR) region. The CW laser output was passed through a 90:10 fiber power splitter. The greater optical power output was then fed into an erbium doped fiber amplifier (EDFA) 320, the output of which subsequently non-resonantly pumps a Brillouin cavity 330 comprising a 75 m long fiber Brillouin ring resonator. The Brillouin cavity 330 has a 95:5 fiber coupler and was set for non-resonant pumping through the use of a fiber circulator, e.g., only the backwards propagating Stokes wave is resonant on the cavity. The Brillouin cavity 330 was placed inside a vacuum chamber with temperature and vibration control to stabilize the performance independently, free from any external environmental factors. The corresponding acoustic damping from the silica fiber redshifts the light output by the amount of the resultant Brillouin shift at the operating wavelength.

The Brillouin frequency shift depends on the material composition and to some extent the temperature and pressure of the fiber (e.g., measurements described herein were carried out at room temperature, unless otherwise described) The Brillouin fiber ring Stokes radiation linewidth can be several orders of magnitude lower than that of the incident pump beam. The Brillouin cavity 330 operates as a nonlinear narrow bandwidth filter which passes radiation at the Stokes wavelength only. Contrary to lasers with population inversion, the spontaneous Brillouin scattering fundamentally limits the degree of monochromaticity of the Stokes radiation as opposed to spontaneous emission in recombination-generation schemes.

The Stokes output is next passed through an electro-optic modulator (EOM) 340a,b in order to transfer the Brillouin shifted stokes light back into the frequency of the pump, depending upon the operational frequency of the EOM (e.g., a Mach-Zehnder intensity modulator) which is set to match the Brillouin shift. The EOM 340a,b was driven with a frequency synthesizer 342a,b followed by a high power RF amplifier 344a,b operated at 1 W in the desired frequency range. The output from the EOM 340a,b was then passed through variable optical attenuator (VOA) 346a,b for precise control of the optical power, which is subsequently injected back into the CW laser via the lower power channel of the initial fiber coupler. The resultant output from the EOM 340a,b contains sidebands. In FIG. 5, the first blue-shifted sideband from modulation was injected back into the pump laser; the remaining sidebands from EOM operation did not need to be filtered out as the pump frequency. The resultant sidebands from EOM operation were also easily tuned in power using a DC input to the EOM 340a,b. As such, the diode laser can be self-injection locked and can improve its output efficiency iteratively in the loop until a thermal equilibrium of the Brillouin cavity noise floor is reached. The Stokes radiation from the Brillouin cavity 330 is the output of the system which manifests an SBS laser. Externally, to the Brillouin generation, the frequency difference of the two optical lines is disciplined through frequency modulation spectroscopy of a gas in the millimeter-wave domain.

In the example oscillator 300 schematically illustrated by FIG. 5, the frequency difference is controlled in the optical interferometer 220 (e.g., where the frequency modulation is realized) through an optical frequency shifter, such as an electro-optic single side band modulator or an acousto-optic modulator.

Figure 6:
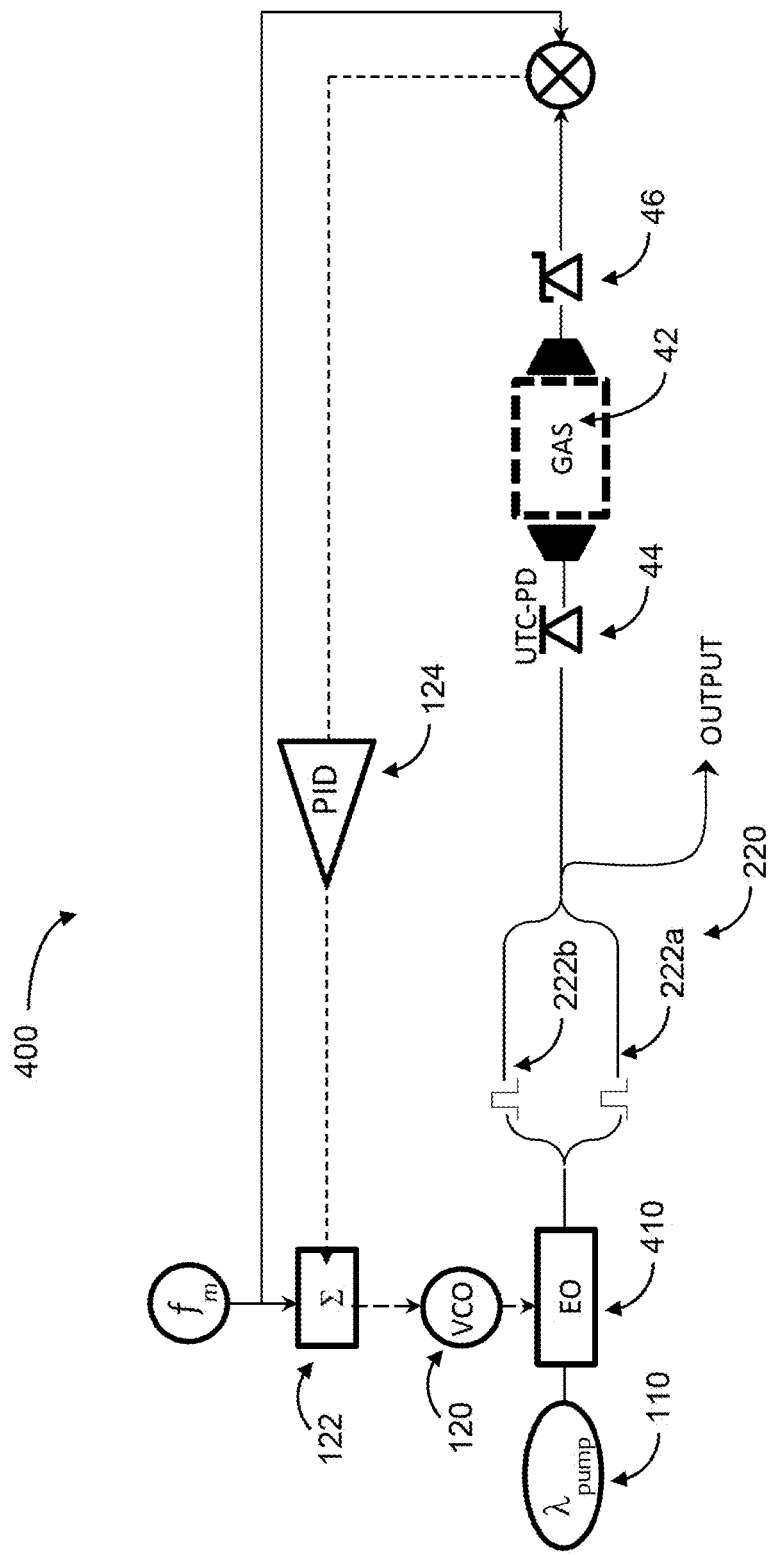
FIG. 6 schematically illustrates an example millimeter-wave oscillator configured to generate two optical lines through spectral filtering of harmonics generated from an electro-optic driven by a voltage-controlled oscillator in accordance with certain implementations described herein.

FIG. 6 schematically illustrates another example photonic millimeter-wave local oscillator 400 in accordance with certain implementations described herein. The oscillator 400 of FIG. 6 comprises a continuous wave laser 110 that is electro-optically phase modulated with high RF power at 10 GHz. The cascaded optical phase modulator 410 results in a large number of optical side bands generated from the CW pump laser 110. Spectral filtering allows the frequency difference from two optical sidebands to be selected by steps of about 10 GHz. Millimeter-wave frequencies can be obtained with this method when the two optical side bands beat on a photosensitive element. Frequency modulation can be realized by modulating the voltage-controlled oscillator 120 that drives the electro-optic modulator 112. Feedback control can also be realized through the voltage-controlled oscillator 120. Externally, the frequency difference of the two optical lines can be disciplined through frequency modulation spectroscopy of a gas in the millimeter-wave domain.

Figure 7:
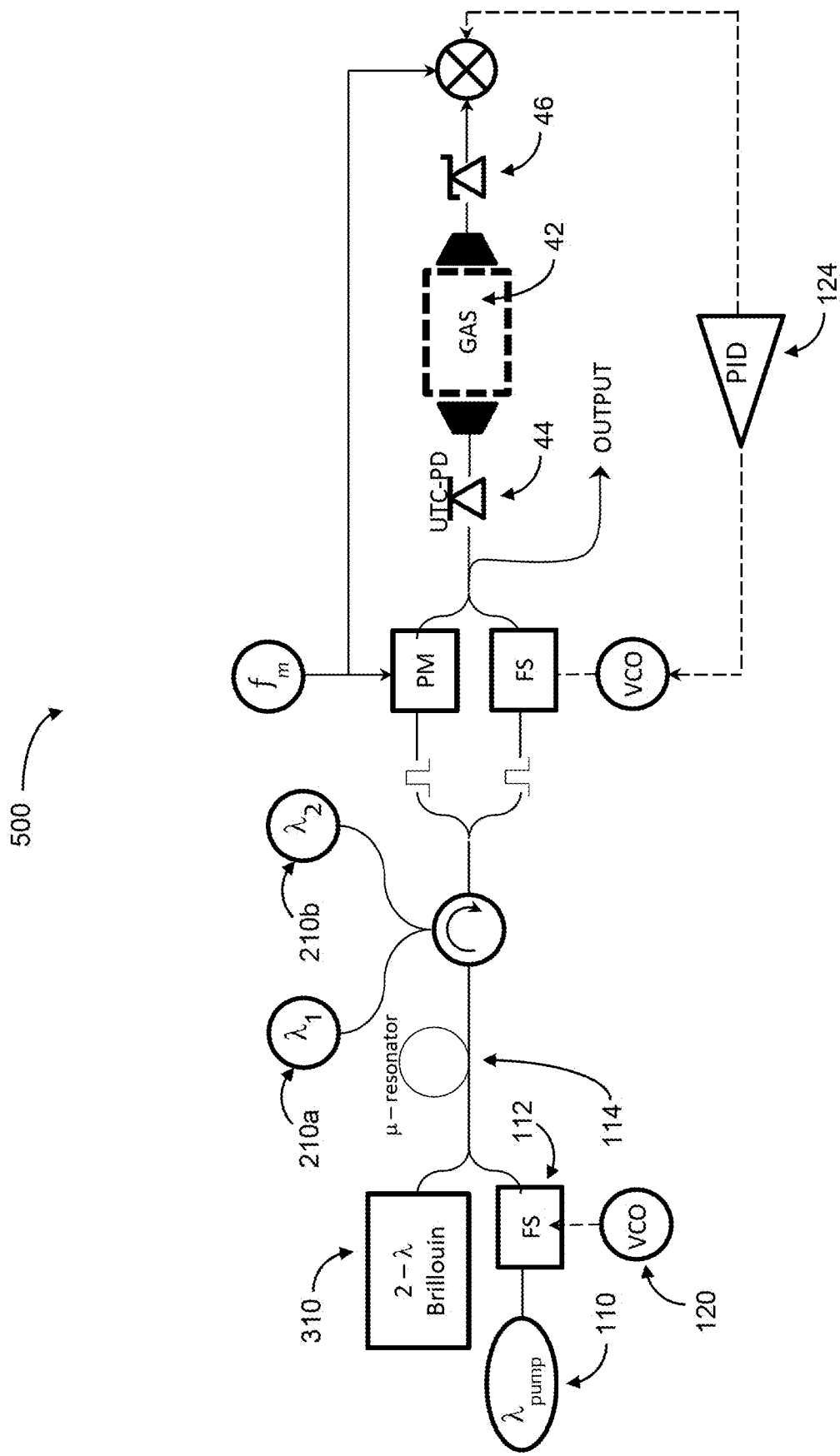
FIG. 7 schematically illustrates an example millimeter-wave oscillator in accordance with certain implementations described herein. in accordance FIG. 8 schematically illustrates the electro-optic down-conversion of two optical lines in which a voltage-controlled oscillator driving the electro-optic device is phase-locked to the frequency difference of the two optical lines, resulting in the electro-optic division of the two optical lines to a microwave frequency in accordance with certain implementations described herein.

FIG. 7 schematically illustrates another example photonic millimeter-wave oscillator 500 in accordance with certain implementations described herein. The example oscillator 500 of FIG. 7 can be configured to generate an optical pulse train with a repetition rate frequency in the millimeter-wave domain with the injection of two diode lasers and a prior stabilization to two optical lines with a frequency separation of a few Terahertz. The example oscillator 500 of FIG. 7 can be configured to reduce the timing noise of an optical pulse train by stabilizing it in a two-point lock to the dual-wavelength Brillouin laser 310. In certain implementations, this example oscillator 500 can achieve the lowest noise in the millimeter-wave region. Therefore, it is possible to neglect intermodulation effect in frequency modulation spectroscopy where the phase noise of the local oscillator at 2 fm limit the short term fractional frequency stability. The frequency difference of the two laser diodes is then disciplined through molecular spectroscopy.

Photonic Generation of Mm-Wave Radiation

In certain implementations, the light from two diode lasers 10a,b, tuned $\Delta f_{diode}$~300 GHz apart are combined with a 50/50 combiner/splitter. For example, as shown in FIG. 11, the light on the upper optical pathway 20a can be amplified using an Erbium-doped fiber amplifier (EDFA) 30a and then sent into a vacuum chamber 40 via a hermetically sealed feedthrough. The light can be photo-detected by a UTC-PD 44 which subsequently radiates mm-wave radiation at a frequency equal to the frequency difference of the two diodes 10a,b. Additionally, one of the diodes lasers 10a,b can be current modulated at $f_{mod}$=500 kHz to generate sidebands of the same frequency in the mm-wave radiation.

The mm-wave power can be monitored via the current controller powering the UTC-PD 44. For example, the UTC-PD 44 can be biased with −1V exposed to approximately 20 mW of optical power. As a result, 9 mA of photocurrent can be pulled from the current controller, which corresponded to ~200 µW of radiated mm-wave power.

Millimeter-Wave Frequency Readout

Because the frequency of the mm-wave radiation was equal to the frequency difference of the diode lasers 10a,b, the frequency difference was measured via optical down-conversion. The light on the lower optical pathway 20b in FIG. 11 was amplified using an EDFA 30b and sent through an electro-optic (EO) comb 62. Light from both diode lasers 10a,b passed through three cascaded EO modulators, driven by a synthesizer 64 referenced to a stable rubidium (Rb) reference (Microsemi Rb 8040c). The EO-comb 62 generated more than 15 sidebands (comb-modes) with a spacing of $f_{synth}$~10 GHz between modes. The sidebands spanned the gap between the two laser-frequencies and produced a set of overlapping modes that were isolated using and optical band-pass filter (OBPF) 70. The isolated lines were photodetected and produced a beat-note with a frequency that was low enough ($f_{beat}$<1 GHz) to be measured by a conventional spectrum analyzer. This frequency was directly related to the mm-wave frequency by:

$$f_{mm} = \Delta f_{diode} = 2nf_{synth} \pm f_{beat} \quad (1)$$

Where n was the n-th order comb mode. The sign of the $f_{beat}$ term was determined experimentally by changing $f_{synth}$ a small amount and observing the resulting shift in $f_{beat}$. The beat-note frequency was subsequently divided by 32 and sent to a frequency counter, also referenced to the Rb clock. The frequency counter 90 tracked the absolute frequency of the mm-wave oscillator over time.

Molecular Spectroscopy with Mm-Wave Radiation

The mm-wave radiation interacted with $N_2O$ gas 42 inside of a vacuum chamber 40 (base pressure: ~20 mTorr). The radiation was generated at the UTC-PD 44 and guided through a tapered waveguide into a directional horn 610. A mirrored horn 612 and tapered waveguide propagated the mm-wave radiation onto a Schottky diode 46, which generated an electrical current proportional to the incident mm-wave power. A bias-tee 48 split the signal into DC and RF components which ultimately readout the molecular absorption and error signals, respectively.

The vacuum chamber 40 contained ~50 mTorr partial pressure of $N_2O$ gas 42. A steady-state pressure of gas was maintained through the use of chamber pressure measurements at one second intervals, which fed back to a precision flow controller. This loop maintained the chamber pressure to ±20 µTorr. The gas 42 permeated the interior of the mm-wave components, and thus utilized the entire path length between UTC-PD 44 and Schottky diode 46 for absorption (~20 cm).

The mm-wave frequency was tuned to the $J^013 \rightarrow J=12$ transition resonance at 301.442 GHz. The absolute frequency was verified using the frequency readout method of the previous section. Since the transition linewidth was approximately 1 MHz, this precision was sufficient to observe the absorption line. To feedback the peak of the absorption feature to the mm-wave frequency, an error signal was generated from the derivative of the absorption. This was accomplished through lock-in detection of the mm-wave sidebands at $f_{mod}$=500 kHz.

Frequency Stabilization

The frequency difference between diode lasers 10a,b, and thus mm-wave frequency, was locked to the molecular rotational transition via a PID loop from a FPGA-based signal processor 50 (Liquid instruments Moku Lab). The FPGA 50 performed lock-in detection of the error signal as well as applied proportional and integrator gains to the control signal ultimately fed back to one of the diode lasers 10a. The phase difference between $f_{mod}$ sent to the diode laser 10a and FPGA 50 was tuned so that the PID loop locked the mm-wave oscillator to the peak of the absorption feature.

The mm-wave power was stabilized via two methods. In the first method, the UTC-PD 44 was temperature controlled (~295K) using a thermo-electric cooler (TEC). Because the UTC-PD 44 was in vacuum, temperature stabilization to ±10 mK. In the second method, the UTC-PD photocurrent was actively stabilized through a feedback loop between the current controller and the EDFA 30a on the upper optical arm 20a. Despite the EDFA 30a being saturated, the current to the pump diode 10a,b could be varied to make small adjustments to the total amplified optical power. These adjustments, along with temperature stabilization, held the UTC-PD photocurrent to within ±20 nA of the 9 mA setpoint.

Figure 12A:
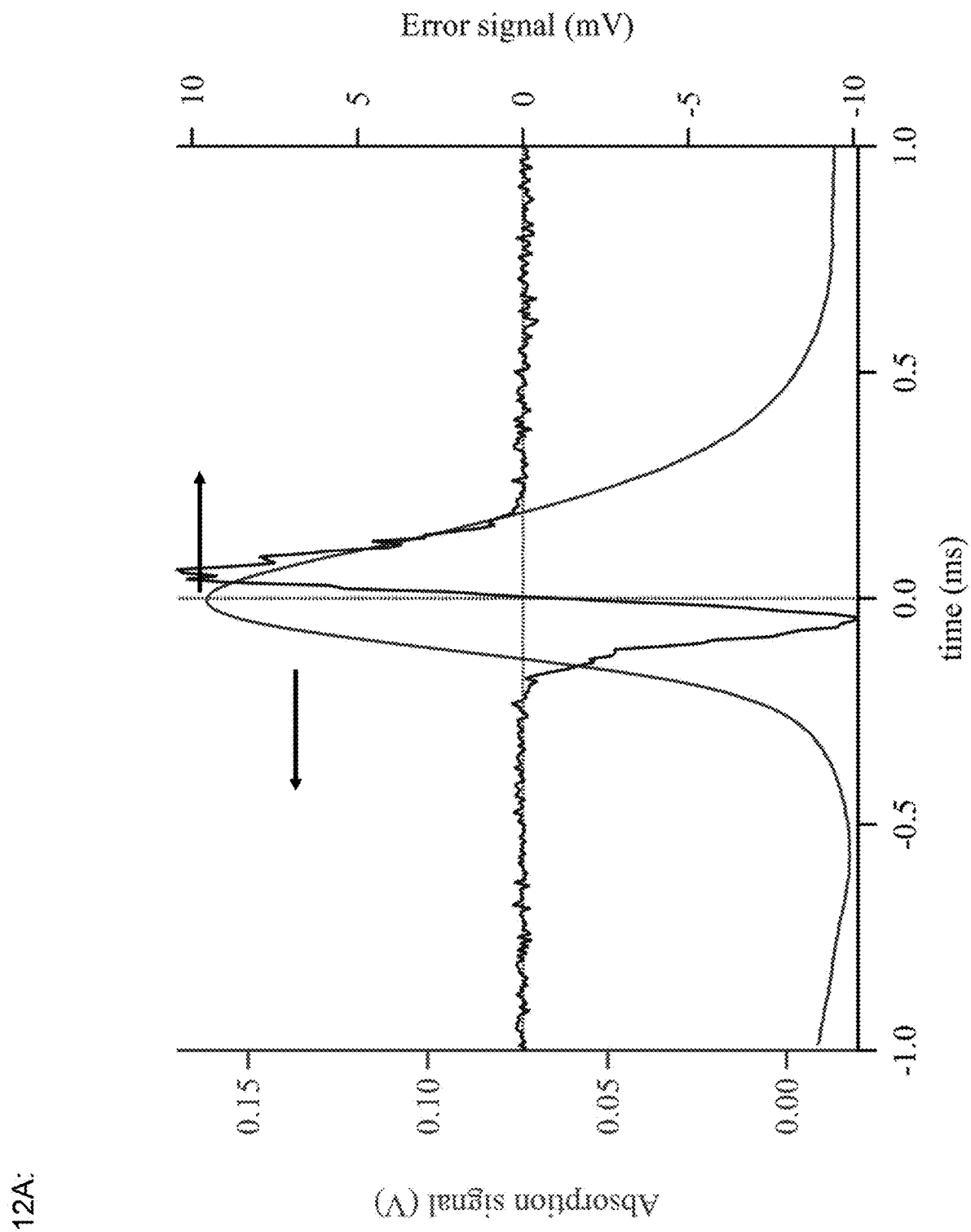
FIG. 12A plots an absorption line (e.g., absorption signal versus time) of a rotational line of nitrous oxide at 301.442 GHz and its associated demodulated dispersion curve (e.g., error signal versus time) in accordance with certain implementations described herein.

Initial spectroscopy was performed by applying a frequency ramp to one of the diode lasers 10a,b. This swept the frequency of the mm-wave oscillator 100 across the molecular resonance to measure the absorption lineshape and corresponding error signal. FIG. 12A shows the results of such a scan. The absorption signal was filtered with a low-pass filter at 1 kHz to remove residual amplitude noise from the data. The error signal, however, was left unfiltered to help estimate the signal-to-noise ratio. The signal to noise ratio of the error signal determined the quality of the lock achieved by the PID loop. This error signal was used to qualitatively tune parameters in the experiment such as $N_2O$ gas pressure, UTC-PD photocurrent (e.g., a proxy for mm-wave power), $f_{mod}$ and its corresponding amplitude, and the phase difference between the $f_{mod}$ signal sent to the diode laser and the lock-in detection.

The quantitative performance of the mm-wave oscillator was characterized by counting the frequency output of the mm-wave oscillator while locked to the absorption line. To determine the short-term stability of the oscillator, the frequency was counted with a 1 ms gate time for ~60 s and subsequently analyzed by calculating the modified Allan deviation, the results of which can be seen in FIG. 12C. The short-term behavior of the oscillator shows white-noise behavior as it averages down following a $1.5 \times 10^{-11}/\tau$ slope, where $\tau$ is the averaging time, up to an averaging time of one second. Deviations from this slope at $\tau < 10^{-2}$ s are most likely an artifact of the gate time not being short enough.

Long-term performance of the mm-wave oscillator was determined by the frequency output, averaged over one second, for $3 \times 10^4$ s. The counted frequency results are plotted in FIG. 12B. These data were subsequently analyzed with the total Allan deviation, as it is a better predictor of long-term behavior than the modified Allan deviation in shorter data runs. The final results are displayed in FIG. 12C. The long-term deviation matches up nicely with the faster gate time results at $\tau=1$ s, and averages all the way down to $4 \times 10^{-12}$ at $\tau=10^4$ s. The total deviation, however, quickly strays from the purely white-noise limit. This is indicative of slight frequency drifts and/or cycles over long time scales. Given the local maximum at $\tau=10^3$ s, it is very likely the result of temperature fluctuations.

The performance of the oscillator at one-second averaging times and shorter is limited by the signal-to-noise of the error signal (see FIG. 12A). The Allan deviation can be improved by at least an order of magnitude; it should eventually be limited by the absorption line of the molecule on the $10^{-13}$ level for $N_2O$.

The noise in the error signal has several contributions. One contribution is the oscillator phase noise from the two diode lasers. Using a more sophisticated photonic source to generate the mm-wave radiation with lower phase noise, at a Fourier frequency equal to $f_{mod}$, would decrease the total noise in the system. Along the same lines, increasing $f_{mod}$ to reach the shot-noise floor of the oscillator would be an improvement. To modulate the diode lasers faster than the 500 kHz, a different oscillator can be considered. An interesting candidate could involve a kerr-soliton generated in a microresonater. Another contribution to noise is amplitude-to-phase noise conversion by the UTC-PD. All photodiodes, being non-linear devices (e.g., respond to light-field intensity), generate some added phase noise as the result of detecting intensity fluctuations. This contribution has not been characterized in detail for the particular UTC-PD used in the measurements described herein. The use of established methods for combating amplitude-to-phase noise could potentially improve the oscillator stability. A third contribution to the noise is the noise-equivalent power of the Schottky detection diode. By operating with relatively low mm-wave power (<200 µW), this contribution may be a significant contribution to the noise in the detected signal. Several potential improvements could be made, which essentially increase the mm-wave power arriving at the schottky diode. Another interesting solution to this problem would be to perform heterodyne detection of the mm-wave radiation via a mm-wave mixer. While signal loss and mm-wave power would also be technical challenge to heterodyne detection, there would be marked improvements in NEP.

The short-term performance of the oscillator can be improved with a stronger and narrower absorption signal, leading to a larger slope of the error-signal zero crossing. A different choice of molecule can likely lead to these kinds of improvements. The molecular absorption strength saturates at a mm-wave intensity that is inversely proportional to molecular dipole. While the mm-wave power produced in the measurements described herein was not enough to saturate the absorption of $N_2O$, the mm-wave power was enough to saturate a molecule like OCS. Additionally, the strength of the line at ~300 GHz depends on the occupation of the quantum level at about room temperature. The quantum occupation of $N_2O$ peaks around 600 GHz, whereas OCS peaks much closer to 300 GHz. In addition, the absorption linewidth is proportional to $p_T/M$, where T is temperature and M is the molar mass of the molecule. Therefore at room temperature, a heavier molecule will have a slightly narrower absorption linewidth, leading to an increase in error-signal slope. For these reasons, locking the mm-wave oscillator to a rotational transition in OCS could improve its short-term stability.

The long-term frequency stability is not limited by signal-to-noise of the molecular absorption error signal in the measurements described herein. This means that the measured frequency drifts over time due to drifts in the location of the error-signal zero-crossing. These drifts arise in two ways. A first contribution to the drift is changes in the molecular absorption strength. FIG. 12A shows the baseline of the absorption signal is not flat. This means the perceived center of the absorption feature will be more or less affected by the background as the molecular absorption becomes stronger or weaker, respectively. A second contribution to the drift is changes in the absorption width. FIG. 12A also shows the absorption signal is not perfectly symmetric about its center. Thus, changes in the absorption linewidth will cause the error signal zero crossing to drift as well. These changes in the absorption feature, which change the measured frequency of the mm-wave oscillator, are likely not changes in the molecular rotational frequency. Rather, these are shortcomings in the method of spectroscopy used to interrogate the molecular absorption feature. Specifically, fluctuations in mm-wave power and gas temperature, lead to changes in the absorption strength, and changes in the partial pressure of $N_2O$ lead to changes in the absorption linewidth. The Allan deviation above one second averaging time is likely affected by variation in these parameters. Temperature of the gas in particular is likely to blame since temperature was not actively stabilized for the measurements disclosed herein. Instead, the inefficient thermal transport of the steel vacuum chamber walls was used to dampen absorption signal intensity fluctuations due to temperature change.

An elegant solution to drifts in the measured absorption frequency is to use higher order derivatives of the error-signal. This can be achieved by using a harmonic of the modulation frequency for lock-in detection. Error signals generated with higher order derivatives indeed dampen the effects of long term drifts, but come at the cost of lower signal strength and thus worse signal-to-noise limited performance. Additionally, no order of derivative can fully cancel out a background slope if it is non-linear or fluctuating in time.

Figure 12B:
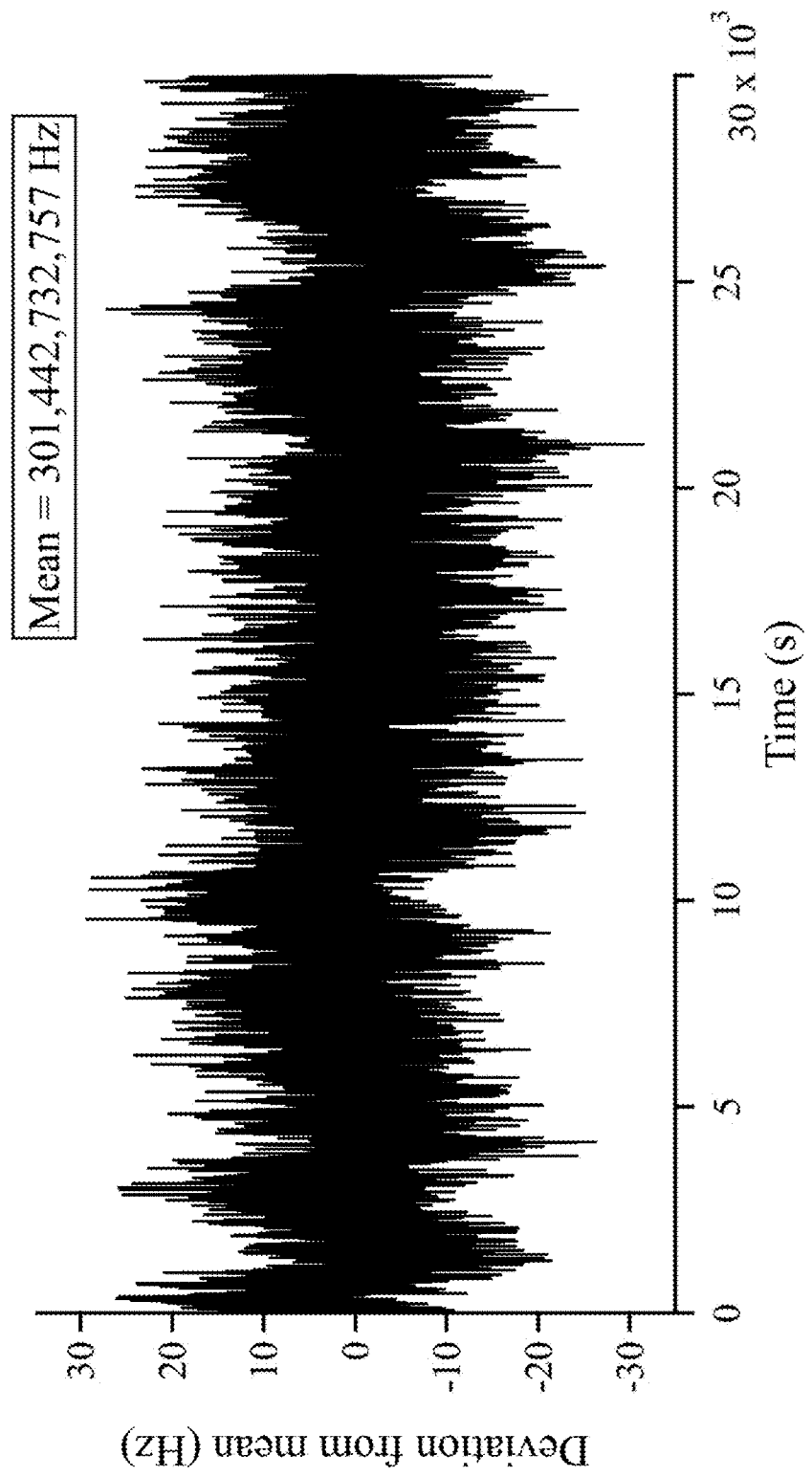
FIG. 12B plots a time trace of the measured nitrous oxide frequency at 301.442 GHz in accordance with certain implementations described herein.
Figure 12C:
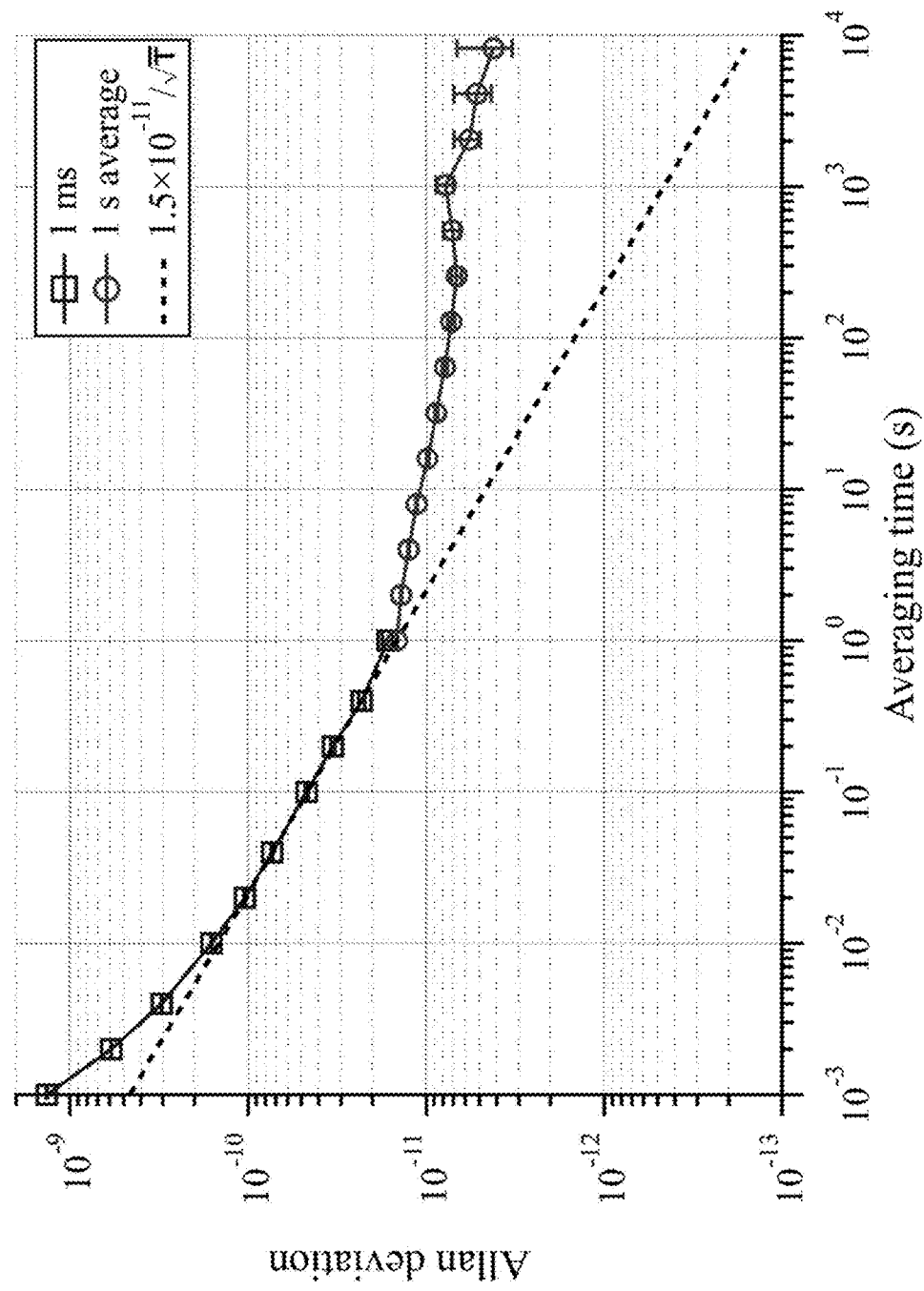
FIG. 12C plots the fractional frequency stability in terms of Allan deviation of the molecular clock based on nitrous oxide at 301.442 GHz in accordance with certain implementations described herein.

Despite the limitations of oscillator performance, the mean of the frequency data presented in FIG. 12B, with an uncertainty of only 7 Hz, corresponds to the most precise measurement of this particular rotational transition frequency ever made. Precision of this level in other room temperature gas samples is not unprecedented, but the measurements disclosed herein lack the influence of any kind of cavity or etalon effects that most precision microwave spectroscopy must contend with. The advantage of precision without a cavity can lead to breakthroughs in accuracy as well. This is supported by good agreement between these measurements and the most accurate measurement in the literature thus far of 301442.71±0.05 MHz, but which did not provide details of methodology. Since certain implementations described herein can be easily generalized to many molecules and many rotational levels, they may provide a fresh new technique for precision molecular rotational spectroscopy. If the frequency accuracy of the mm-wave oscillator described herein can be determined on the same level as the precision, then the prospects for a standard frequency reference are quite good. The oscillator short-term stability of certain implementations described herein already rivals that of the commercially available Rb-clock reference that was used in the measurements described herein. With the potential improvements in both short and long-term performance discussed herein, photonic oscillators disciplined by molecular rotations can be a candidate frequency reference for future mm-wave frequency applications.

Figure 13:
FIG. 13 is a graph of the intermodulation effects of different millimeter-wave oscillators in accordance with certain implementations described herein.

FIG. 13 shows the stability level at 1 second averaging time in the case of local oscillators having different power spectral density of phase noise. Intermodulation effect in frequency modulation spectroscopy arose from phase noise of the local oscillator at twice the frequency modulation. Measurements of the phase noise of three different photonic millimeter-wave oscillators show that, while two commercially available diode lasers can reach a stability as low as $10^{-11}$, the local oscillators such as microcomb or dual-wavelength lasers (that are not commercially available) can provide superior stabilities <$10^{-11}$.

ADDITIONAL INFORMATION

Example, non-limiting experimental data are included herein to illustrate results achievable by various implementations of the systems and methods described herein. All ranges of data and all values within such ranges of data that are shown in the figures or described in the specification are expressly included in this disclosure. The example experiments, experimental data, tables, graphs, plots, figures, and processing and/or operating parameters (e.g., values and/or ranges) described herein are intended to be illustrative of operating conditions of the disclosed systems and methods and are not intended to limit the scope of the operating conditions for various implementations of the methods and systems disclosed herein. Additionally, the experiments, experimental data, calculated data, tables, graphs, plots, figures, and other data disclosed herein demonstrate various regimes in which implementations of the disclosed systems and methods may operate effectively to produce one or more desired results. Such operating regimes and desired results are not limited solely to specific values of operating parameters, conditions, or results shown, for example, in a table, graph, plot, or figure, but also include suitable ranges including or spanning these specific values. Accordingly, the values disclosed herein include the range of values between any of the values listed or shown in the tables, graphs, plots, figures, etc. Additionally, the values disclosed herein include the range of values above or below any of the values listed or shown in the tables, graphs, plots, figures, etc. as might be demonstrated by other values listed or shown in the tables, graphs, plots, figures, etc. Also, although the data disclosed herein may establish one or more effective operating ranges and/or one or more desired results for certain implementations, it is to be understood that not every implementation need be operable in each such operating range or need produce each such desired result. Further, other implementations of the disclosed systems and methods may operate in other operating regimes and/or produce other results than shown and described with reference to the example experiments, experimental data, tables, graphs, plots, figures, and other data herein.

The invention has been described in several non-limiting implementations. It is to be understood that the implementations are not mutually exclusive, and elements described in connection with one implementation may be combined with, rearranged, or eliminated from, other implementations in suitable ways to accomplish desired design objectives. No single feature or group of features is necessary or required for each implementation.

For purposes of summarizing the present invention, certain aspects, advantages and novel features of the present invention are described herein. It is to be understood, however, that not necessarily all such advantages may be achieved in accordance with any particular implementation. Thus, the present invention may be embodied or carried out in a manner that achieves one or more advantages without necessarily achieving other advantages as may be taught or suggested herein.

As used herein any reference to "one implementation" or "some implementations" or "an implementation" means that a particular element, feature, structure, or characteristic described in connection with the implementation is included in at least one implementation. The appearances of the phrase "in one implementation" in various places in the specification are not necessarily all referring to the same implementation. Conditional language used herein, such as, among others, "can," "could," "might," "may," "e.g.," and the like, unless specifically stated otherwise, or otherwise understood within the context as used, is generally intended to convey that certain implementation include, while other implementations do not include, certain features, elements and/or steps. In addition, the articles "a" or "an" or "the" as used in this application and the appended claims are to be construed to mean "one or more" or "at least one" unless specified otherwise.

As used herein, the terms "comprises," "comprising," "includes," "including," "has," "having" or any other variation thereof, are open-ended terms and intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present). As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain implementations require at least one of X, at least one of Y, and at least one of Z to each be present.

Thus, while only certain implementations have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the implementations described therein.

What is claimed is:

1. A photonic millimeter-wave oscillator, based on a heterodyne beatnote of two continuous wave lasers, configured to provide a narrow linewidth output when a frequency difference between the two continuous wave lasers is disciplined with rotational spectroscopy of molecules using frequency modulation spectroscopy, wherein one of the two continuous wave lasers is frequency- or phase-modulated such that a resulting signal generated through photomixing of the two continuous wave lasers is correspondingly modulated, enabling demodulation of the signal to reveal molecular absorption features.

2. The oscillator of claim 1, wherein the frequency modulation spectroscopy is realized by modulating directly one diode laser through current.

3. The oscillator of claim 1, wherein the frequency modulation spectroscopy is realized by modulating one of the two continuous wave lasers with a phase modulator externally.

4. The oscillator of claim 1, wherein feedback control through a PID filter is realized by direct current modulation or by modulation of an optical frequency shifter on one of the two continuous wave lasers.

5. The oscillator of claim 1, wherein an error signal derived from one of the molecular absorption features is used to stabilize the frequency difference, thereby disciplining the oscillator to the one of the molecular absorption features.

6. The oscillator of claim 5, wherein the one of the molecular absorption features is a molecular rotational transition.

7. A photonic millimeter-wave oscillator, based on the photodetection of an optical pulse train generated by an optical frequency comb, configured to provide a continuous-wave narrow linewidth output when a repetition rate frequency of the optical pulse train is disciplined with rotational spectroscopy of molecules using frequency modulation spectroscopy.

8. The oscillator of claim 7, wherein an error signal derived from the rotational spectroscopy of molecules using frequency modulation spectroscopy is used to stabilize the repetition rate frequency of the optical pulse train.

9. A method of stability transfer of an optical pulse train repetition rate noise properties to two diode lasers through optical injection, the method comprising providing a narrow linewidth output when a frequency difference between the two diode lasers is disciplined with rotational spectroscopy of molecules using frequency modulation spectroscopy.

10. The method of claim 9, wherein feedback control is realized directly to the pump frequency in the case of a microresonator-based optical frequency comb.

11. The method of claim 9, wherein feedback control is realized externally through an optical frequency shifter when two spectral lines are extracted from the optical pulse train through spectral filtering.

12. The method of claim 9, wherein a frequency difference of two Stokes waves is generated through stimulated Brillouin scattering in a fiber cavity and is disciplined by the rotational spectroscopy of molecules to provide a narrow linewidth signal.

13. The method of claim 9, further comprising deriving an error signal from the rotational spectroscopy of molecules using frequency modulation spectroscopy and using the error signal to discipline the frequency difference between the two diode lasers.

14. An electro-optic frequency comb having a repetition rate disciplined by rotational spectroscopy of molecules through a feedback control of a microwave oscillator driving electro-optic modulators, the comb comprising two continuous wave lasers, wherein one of the two continuous wave lasers is frequency- or phase-modulated such that a resulting signal generated through photomixing of the two continuous wave lasers is correspondingly modulated, enabling demodulation of the signal to reveal molecular absorption features.

15. The comb of claim 14, wherein an error signal derived from one of the molecular absorption features is used to stabilize the repetition rate, thereby disciplining the comb to the one of the molecular absorption features.

16. The comb of claim 15, wherein the one of the molecular absorption features is a molecular rotational transition.

17. A method of generating an optical pulse train pre-stabilized with two Stokes waves, the method comprising generating the two Stokes waves using stimulated Brillouin scattering in a fiber cavity into which two diode lasers are optically injected with a frequency difference disciplined by rotational spectroscopy of molecules, wherein one of the two diode lasers is frequency- or phase-modulated such that a resulting signal generated through photomixing of the two diode lasers is correspondingly modulated, enabling demodulation of the signal to reveal molecular absorption features.

18. A method of generating a clock signal and stable baseband or microwave oscillator through electro-optic division of two optical lines, with a frequency difference disciplined by rotational spectroscopy of molecules, through phase-locking of the microwave oscillator driving the electro-optic modulators that generates an error signal.

19. The method of claim 18, further comprising using the error signal to stabilize the frequency difference.

20. A method of generating a clock signal and stable baseband or microwave oscillator through optical frequency division of an optically carried millimeter-wave signal with the synchronization of an optical pulse train with a repetition rate frequency in the microwave and RF domain.

21. A method of cancellation of residual amplitude modulation in an optical phase modulator comprising an heterodyne beatnote of two optical lines disciplined by rotational spectroscopy of molecules.

* * * * *